US012738702B2

(12) United States Patent
Kitao et al.

(10) Patent No.: US 12,738,702 B2
(45) Date of Patent: Sep. 15, 2026

(54) ROTARY CONNECTOR DEVICE HAVING AN ELECTRICAL CONNECTOR IN A CANTILEVER MANNER AND MANUFACTURING METHOD OF ROTARY CONNECTOR DEVICE

(71) Applicants: FURUKAWA ELECTRIC CO., LTD., Tokyo (JP); FURUKAWA AUTOMOTIVE SYSTEMS INC., Inukami-gun (JP)

(72) Inventors: Satoshi Kitao, Inukami-gun (JP); Tomohiro Kitamura, Inukami-gun (JP); Kenji Yoshimura, Inukami-gun (JP)

(73) Assignees: FURUKAWA ELECTRIC CO., LTD., Tokyo (JP); FURUKAWA AUTOMOTIVE SYSTEMS INC., Inukami-gun (JP)

( * ) Notice: Subject to any disclaimer, the term of this patent is extended or adjusted under 35 U.S.C. 154(b) by 364 days.

(21) Appl. No.: 18/539,296

(22) Filed: Dec. 14, 2023

(65) Prior Publication Data

US 2024/0113485 A1 Apr. 4, 2024

Related U.S. Application Data

(63) Continuation of application No. PCT/JP2022/028743, filed on Jul. 26, 2022.

(30) Foreign Application Priority Data

Jul. 28, 2021 (JP) ................................ 2021-123327

(51) Int. Cl.
*H01R 35/04* (2006.01)
*H01R 9/24* (2006.01)
(Continued)

(52) U.S. Cl.
CPC ............... *H01R 39/64* (2013.01); *H01R 9/24* (2013.01); *H01R 43/20* (2013.01); *H01R 43/26* (2013.01)

(58) Field of Classification Search
CPC .............................. H01R 35/04; H01R 35/025
(Continued)

(56) References Cited

U.S. PATENT DOCUMENTS 5,286,219 A * 2/1994 Ueno ..................... H02G 11/00 439/15
7,798,816 B2 * 9/2010 Oishi ................... G01D 11/245 439/15
(Continued)

FOREIGN PATENT DOCUMENTS

| | | | |
|---|---|---|---|
| EP | 3675294 | 7/2020 | |
| JP | 2015-220207 | 12/2015 | |
| JP | 2017130438 A * | 7/2017 | ............ H01R 43/20 |
| WO | WO 2020/075559 | 4/2020 | |
| WO | WO 2020/255935 | 12/2020 | |

OTHER PUBLICATIONS

Extended European Search Report for corresponding EP Application No. 22849475.3-1201, Oct. 10, 2024.
Korean Office Action for corresponding KR Application No. 10-2024-7001669, May 9, 2025 (w/ English machine translation).

*Primary Examiner* — Hae Moon Hyeon
(74) *Attorney, Agent, or Firm* — Mori & Ward, LLP

(57) ABSTRACT

A rotary connector device includes a stator, a rotator, an electrical cable, an electrical connector, and a connector coupling portion. The stator includes a first stator and a second stator. The connector coupling portion is configured to couple the electrical connector to the first stator. The connector coupling portion is configured to support the electrical connector in a cantilever manner with respect to the first stator such that a second surface becomes a free end
(Continued)

in a state where the electrical connector is positioned in a first position and where the second stator is detached from the first stator.

15 Claims, 18 Drawing Sheets

(51) Int. Cl.
*H01R 39/64* (2006.01)
*H01R 43/20* (2006.01)
*H01R 43/26* (2006.01)

(58) Field of Classification Search
USPC .................................................... 439/15, 164
See application file for complete search history.

(56) References Cited

U.S. PATENT DOCUMENTS

| | | | | |
|---|---|---|---|---|
| 10,647,275 | B2 * | 5/2020 | Ushiyama .......... | H01R 13/5216 |
| 10,686,286 | B2 * | 6/2020 | Ushiyama ............ | H01R 35/025 |
| 11,196,225 | B2 * | 12/2021 | Fujimoto ............. | H01R 13/688 |
| 11,444,422 | B2 * | 9/2022 | Kitao ................... | H01R 35/025 |
| 2005/0124177 | A1 * | 6/2005 | Umemura ............ | H01R 35/025<br>439/15 |
| 2009/0007399 | A1 * | 1/2009 | Sato ..................... | H01R 13/741<br>24/458 |
| 2021/0218210 | A1 | 7/2021 | Hasegawa | |
| 2022/0109276 | A1 * | 4/2022 | Endo .................... | H01R 13/506 |

* cited by examiner

ROTARY CONNECTOR DEVICE HAVING AN ELECTRICAL CONNECTOR IN A CANTILEVER MANNER AND MANUFACTURING METHOD OF ROTARY CONNECTOR DEVICE

CROSS-REFERENCE TO RELATED APPLICATIONS

The present application is a continuation application of International Application No. PCT/JP2022/028743, filed Jul. 26, 2022, which claims priority to Japanese Patent Application No. 2021-123327 filed Jul. 28, 2021. The contents of these applications are incorporated herein by reference in their entirety.

BACKGROUND

Technical Field

The technology disclosed in the present application relates to a rotary connector device and a manufacturing method of a rotary connector device.

Background Art

A manufacturing method of a rotary connector device is described in International patent application publication WO 2020/075559.

SUMMARY

According to one aspect, a rotary connector device includes, a stator, a rotator, an electrical cable, an electrical connector, and a connector coupling portion. The stator includes a first stator and a second stator attached to the first stator. The rotator is provided rotatably about a first rotational axis with respect to the stators and forms, along with the stator, a cable housing space provided to surround the first rotational axis. The electrical cable is provided in the cable housing space. The electrical connector is electrically connected to the electrical cable. The connector coupling portion is configured to couple the electrical connector to the first stator. The electrical connector is positionable in a first position with respect to the first stator in a state where the electrical connector is coupled to the first stator. The electrical connector includes a first surface and a second surface provided on a reverse side of the first surface. The second surface is positioned between the first rotational axis and the first surface in a state where the electrical connector is positioned in the first position. The connector coupling portion is configured to support the electrical connector in a cantilever manner with respect to the first stator such that the second surface becomes a free end in a state where the electrical connector is positioned in the first position and where the second stator is detached from the first stator. The second stator is at least partially positioned between the first stator and the electrical connector in an axial direction defined along the first rotational axis in a state where the electrical connector is positioned in the first position and where the second stator is attached to the first stator.

According to another aspect, a manufacturing method of a rotary connector device includes: setting an electrical cable radially inward of an outer peripheral wall of a first stator; coupling an electrical connector connected electrically to the electrical cable to the first stator via a connector coupling portion; attaching a second stator to the first stator. The coupling the electrical connector to the first stator via the connector coupling portion includes coupling the electrical connector to the first stator via the connector coupling portion so that the electrical connector is positionable in a first position with respect to the first stator. The electrical connector includes a first surface and a second surface provided on a reverse side of the first surface. The second surface is positioned between a first rotational axis and the first surface in a state where the electrical connector is positioned in the first position. The coupling the electrical connector to the first stator via the connector coupling portion includes coupling the electrical connector to the first stator in a cantilever manner via the connector coupling portion so that the second surface becomes a free end in a state where the electrical connector is positioned in the first position and where the second stator is detached from the first stator. The attaching the second stator to the first stator includes attaching the second stator to the first stator so that the second stator is at least partially positioned between the first stator and the electrical connector in an axial direction defined along the first rotational axis.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DESCRIPTION OF THE EMBODIMENTS

Figure 1:
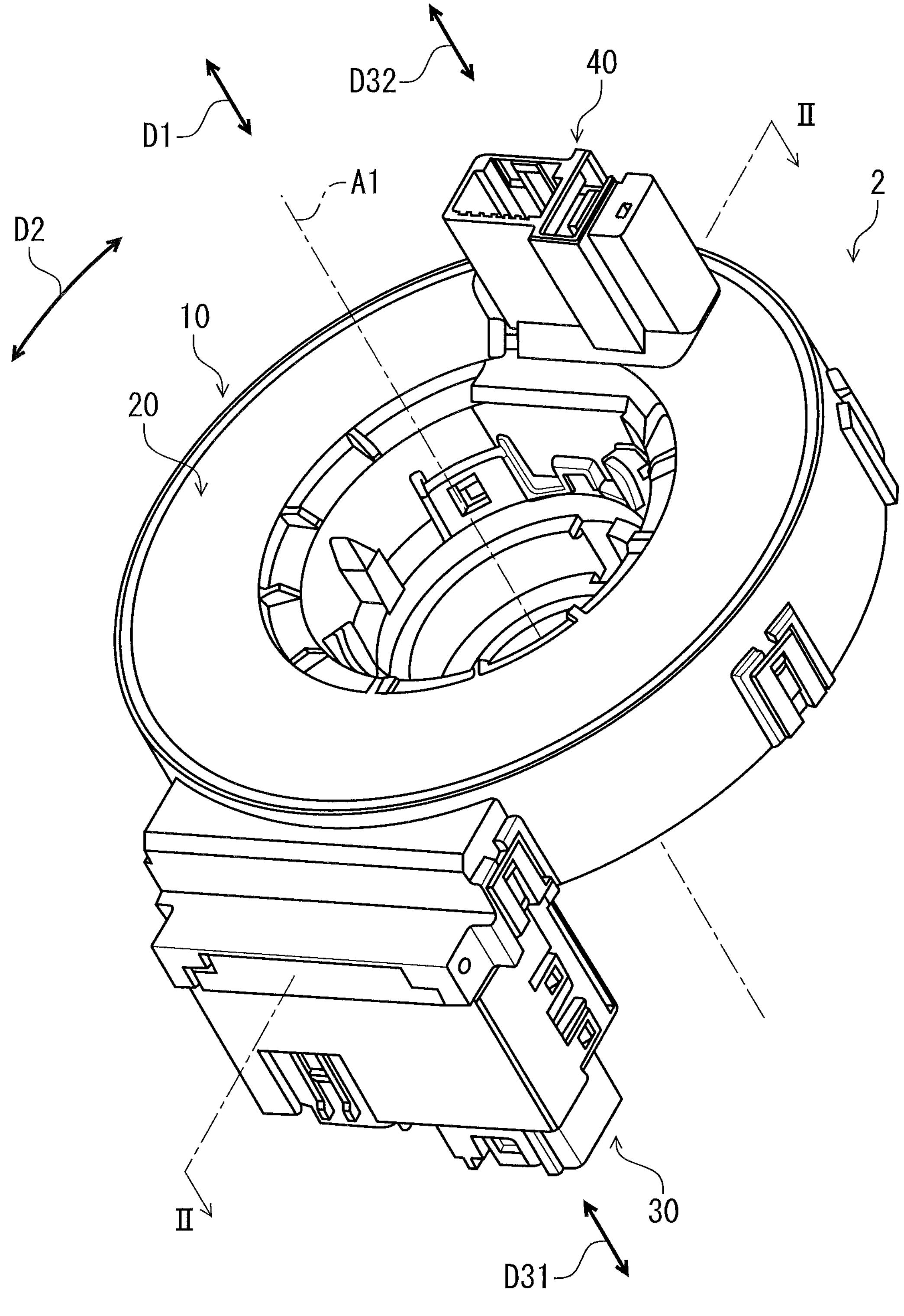
FIG. 1 is a perspective view of a rotary connector device in accordance with a first embodiment.

Embodiments will be described below with reference to the drawings. In the drawings, the same reference signs indicate corresponding or identical configurations.

First Embodiment

As shown in FIG. 1, a rotary connector device 2 includes a stator 10 and a rotator 20. The stator 10 is configured to be attached to a vehicle body. The rotator 20 is provided rotatably about a first rotational axis A1 with respect to the stator 10. The rotator 20 is configured to be coupled to a steering wheel. The rotator 20 is rotatable about the first rotational axis A1 along with the steering wheel.

The rotary connector device 2 includes an electrical connector 30. The electrical connector 30 is coupled to the stator 10. The electrical connector 30 can also be referred to as a first electrical connector 30. The rotary connector device 2 includes a second electrical connector 40. The second electrical connector 40 is coupled to the rotator 20. The first electrical connector 30 is configured such that a vehicle-body-side connector is detachably connected to the first electrical connector 30. The first electrical connector 30 is positioned such that the vehicle-body-side connector is inserted into and detached from the first electrical connector 30 along a first direction D31. The vehicle-body-side connector is electrically connected to electric circuits such as a control device. The second electrical connector 40 is configured to such that a steering-side connector is detachably connected to the second electrical connector 40. The second electrical connector 40 is positioned such that the steering-side connector is inserted into and detached from the second electrical connector 40 along a second direction D32. The steering-side connector is electrically connected to electric circuits such as switches of a steering wheel and an airbag. The vehicle-body-side connector and the steering-side connector can also be referred to as an external connector.

In the present embodiment, the first direction D31 and the second direction D32 are defined parallel to the first rotational axis A1. However, at least one of the first direction D31 and the second direction D32 can be defined not to be parallel to the first rotational axis A1.

Figure 2:
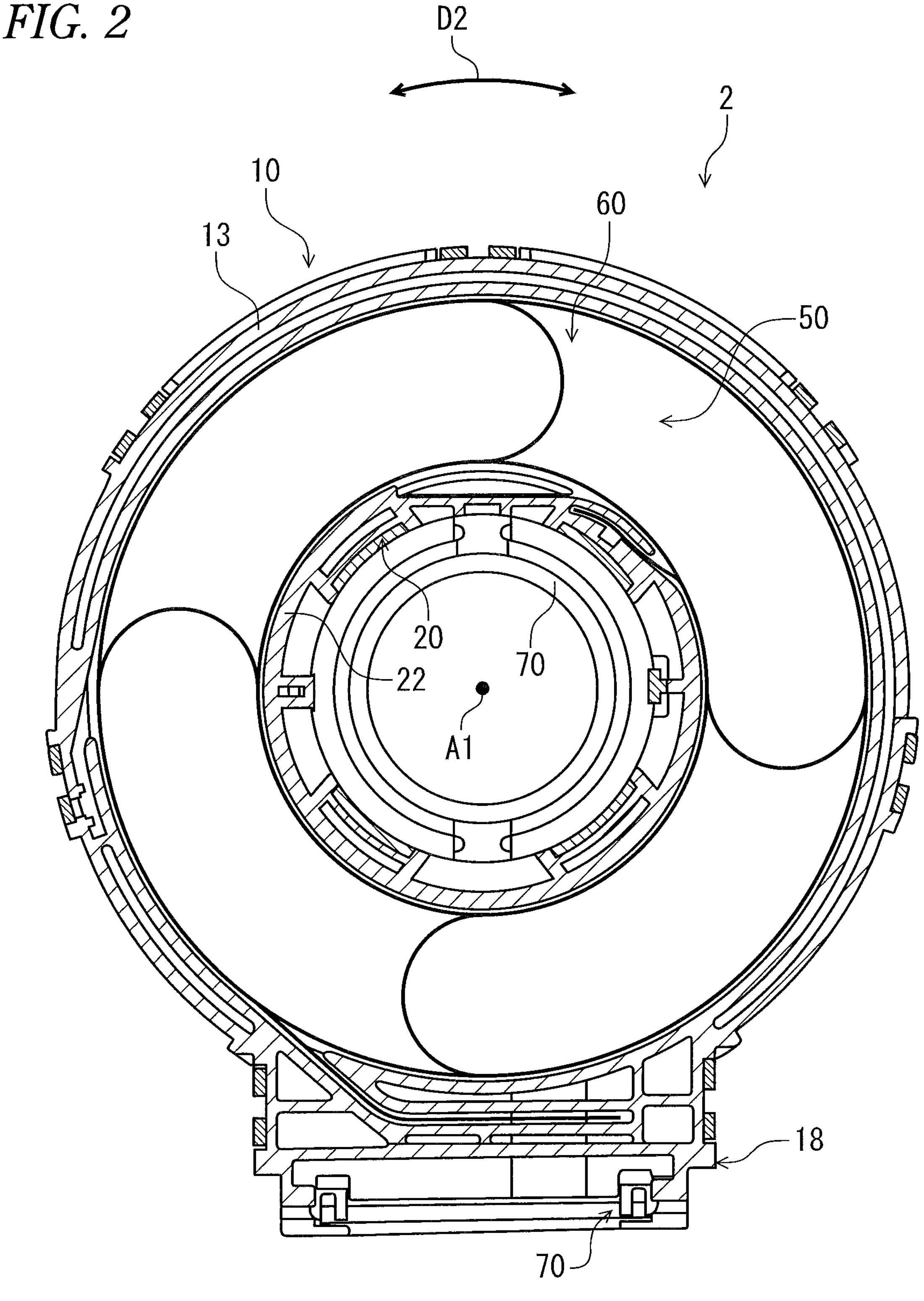
FIG. 2 is a cross-sectional view of the rotary connector device taken along line II-II of FIG. 1.

As shown in FIG. 2, the rotator 20 forms, along with the stator 10, a cable housing space 50 provided to surround the first rotational axis A1. The stator 10 and the rotator 20 forms the cable housing space 50 provided to surround the first rotational axis A1 between the stator 10 and the rotator 20. For example, the cable housing space 50 has an annular shape, and extends in a circumferential direction D2 with respect to the first rotational axis A1.

The rotary connector device 2 includes an electrical cable 60 provided in the cable housing space 50. The electrical connector 30 (see e.g., FIG. 1) is electrically connected to the electrical cable 60. The second electrical connector 40 (see e.g., FIG. 1) is electrically connected to the electrical cable 60. Namely, the electrical cable 60 electrically connects the first electrical connector 30 to the second electrical connector 40 (see e.g., FIG. 1). The electrical cable 60 is positioned in the cable housing space 50. The electrical cable 60 has flexibility and has a flat shape. The electrical cable 60 can also be referred to as a flexible flat cable 60.

Figure 3:
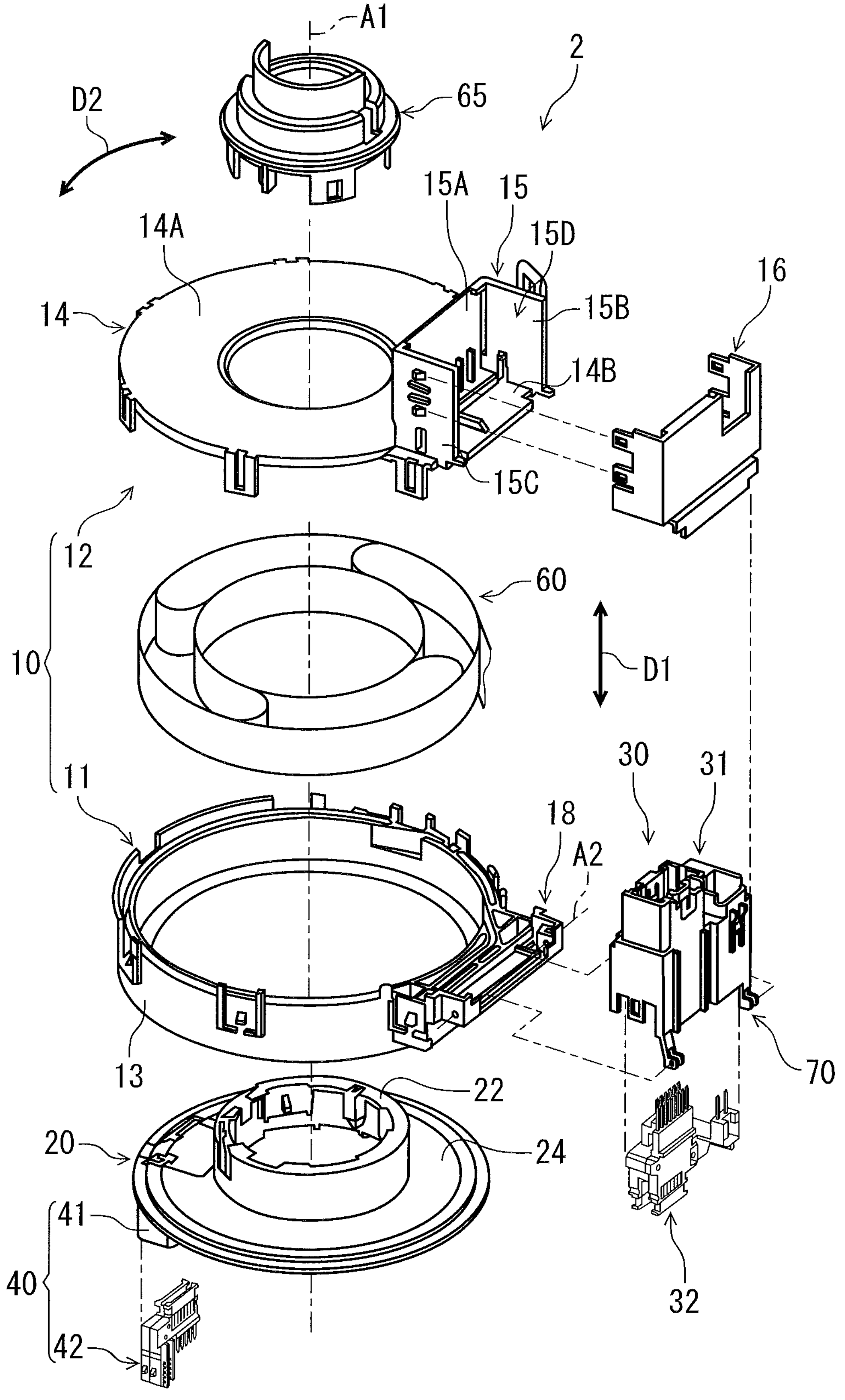
FIG. 3 is an exploded perspective view of a rotary connector device shown in FIG. 1.

As shown in FIG. 3, the rotator 20 includes an inner peripheral wall 22 and a first plate 24. The inner peripheral wall 22 is provided radially inward of the cable housing space 50 (see e.g., FIG. 2). The first plate 24 extends radially outward from the inner peripheral wall 22. The rotary connector device 2 includes a sleeve 65. The sleeve 65 is coupled to the inner peripheral wall 22 of the rotator 20.

The stator 10 includes a first stator 11 and a second stator 12. The second stator 12 is a separate member from the first stator 11. The second stator 12 is attached to the first stator 11. In the first embodiment, the second stator 12 is detachably attached to the first stator 11. The second stator 12 is detachable from the first stator 11 and reattachable to the first stator 11. Here, “detachably attached” includes a configuration which is repeatedly detachable and reattachable without substantial damage. However, the second stator 12 can be non-detachably and non-reattachably attached to the first stator 11.

The first stator 11 includes an outer peripheral wall 13. The outer peripheral wall 13 is provided radially outward of the cable housing space 50 (see e.g., FIG. 2). The second stator 12 includes a second plate 14. The second plate 14 is attached to the outer peripheral wall 13.

The rotary connector device 2 includes a connector coupling portion 70. The connector coupling portion 70 is configured to couple the electrical connector 30 to the first stator 11. The first stator 11 includes a connector support 18. The connector support 18 protrudes radially outward from the outer peripheral wall 13. The connector coupling portion 70 is configured to couple the electrical connector 30 to the connector support 18.

The electrical connector 30 includes a connector case 31 and a lead block 32. The lead block 32 is electrically connected to the electrical cable 60. The lead block 32 is attached to the connector case 31. The connector coupling portion 70 couples the connector case 31 to the first stator 11. The connector coupling portion 70 couples the connector case 31 to the connector support 18.

The second stator 12 includes a first connector cover 15. The first connector cover 15 extends from the second plate 14 in an axial direction D1 defined along the first rotational axis A1. The first connector cover 15 includes a first wall 15A, a second wall 15B, and a third wall 15C. The first wall 15A, the second wall 15B, and the third wall 15C extends from the second plate 14 in the axial direction D1. The second wall 15B and the third wall 15C extends radially outward from the first wall 15A. The second wall 15B is positioned to be spaced apart from the third wall 15C.

The second plate 14 includes a second plate body 14A and an insertion portion 14B. The second plate body 14A extends in the circumferential direction D2. The insertion portion 14B extends radially outward from the second plate body 14A. The second wall 15B and the third wall 15C extends from the insertion portion 14B in the axial direction D1. The first wall 15A, the second wall 15B, the third wall 15C, and the insertion portion 14B form a connector housing space 15D. The electrical connector 30 is positioned in the connector housing space 15D in a state where manufacturing of the rotary connector device 2 is completed.

The rotary connector device 2 includes a second connector cover 16. The second connector cover 16 is a separate member from the second stator 12 and is attached to the second stator 12. The second connector cover 16 is detachably attached to the first connector cover 15. The first connector cover 15 and the second connector cover 16 are configured to hold the electrical connector 30.

Figure 4:
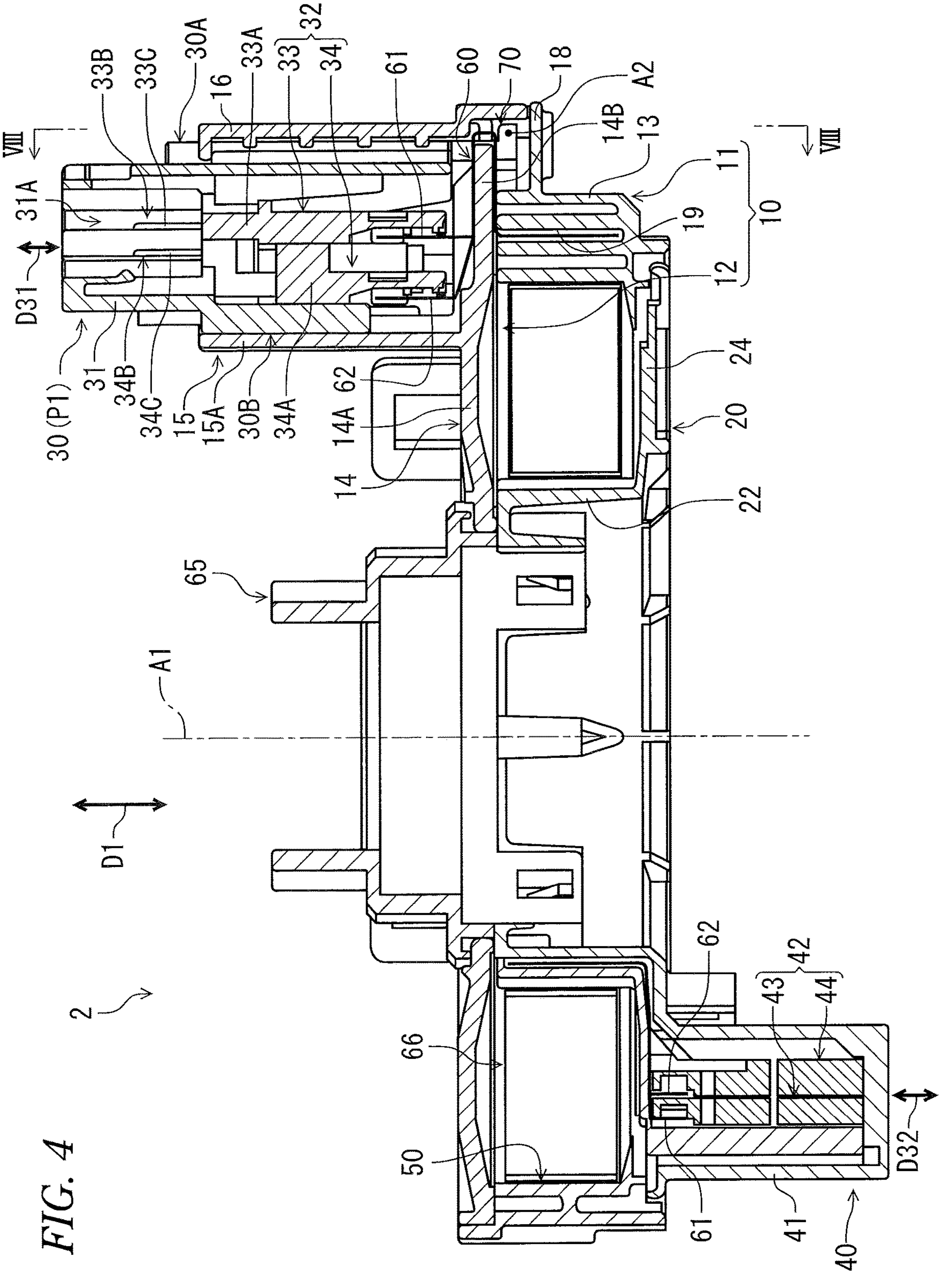
FIG. 4 is a cross-sectional view of a rotary connector device taken along line IV-IV of FIG. 8.

As shown in FIG. 4, the second plate 14 is positioned to be spaced apart from the first plate 24 in the axial direction D1. The insertion portion 14B is positioned to be spaced apart from the first plate 24 in the axial direction D1.

The connector case 31 includes an internal space 31A. The lead block 32 is provided in the internal space 31A. In the first embodiment, the lead block 32 includes a first lead block 33 and a second lead block 34.

The lead block 32 includes a lead block body and a plurality of bus bars. The plurality of bus bars is electrically connected to the electrical cable 60. In the first embodiment, the first lead block 33 includes a first lead block body 33A and a plurality of first bus bar 33B. The second lead block 34 includes a second lead-block body 34A and a plurality of second bus bar 34B. The electrical cable 60 includes a first electrical cable 61 and a second electrical cable 62. The first electrical cable 61 is electrically connected to the plurality of first bus bar 33B. The second electrical cable 62 is electrically connected to the plurality of second bus bar 34B.

The first bus bar 33B includes a first pin terminal 33C. The first pin terminal 33C extends from the first lead block body 33A in the first direction D31. The first pin terminal 33C is contactable with a terminal of the vehicle-body-side connector.

The second bus bar 34B includes a second pin terminal 34C. The second pin terminal 34C extends from the second lead-block body 34A in the first direction D31. The second pin terminal 34C is contactable with a terminal of the steering-side connector.

In the first embodiment, the first pin terminal 33C extends from the first lead block body 33A in the axial direction D1. The second pin terminal 34C extends from the second lead-block body 34A in the axial direction D1. However, the first pin terminal 33C can extend from the first lead block body 33A in a direction different from the axial direction D1. The second pin terminal 34C can extend from the second lead-block body 34A in a direction different from the axial direction D1.

The second electrical connector 40 includes a connector case 41 and a lead block 42. The lead block 42 is electrically connected to the electrical cable 60. The lead block 42 is attached to the connector case 41. The lead block 42 includes a third lead block 43 and a fourth lead block 44. The third lead block 43 is electrically connected to the first lead block 33 of the electrical connector 30 via the first electrical cable 61. The fourth lead block 44 is electrically connected to the second lead block 34 of the electrical connector 30 via the second electrical cable 62.

The first stator 11 includes a cable guide groove 19. The cable guide groove 19 is in communication with the cable housing space 50 (see e.g., FIG. 7). The electrical cable 60 extends from the cable housing space 50 to the electrical connector 30 through the cable guide groove 19.

As shown in FIG. 4, the electrical connector 30 is positionable in a first position P1 with respect to the first stator 11 in a state where the electrical connector 30 is coupled to the first stator 11. The connector coupling portion 70 is at least partially provided radially outward of the electrical connector 30 with respect to the first rotational axis A1 in a state where the electrical connector 30 is positioned in the first position P1. In the first embodiment, the connector coupling portion 70 is partially provided radially outward of the electrical connector 30 with respect to the first rotational axis A1 in the state where the electrical connector 30 is positioned in the first position P1. However, the connector coupling portion 70 can be entirely provided radially outward of the electrical connector 30 with respect to the first rotational axis A1 in the state where the electrical connector 30 is positioned in the first position P1.

The second stator 12 is at least partially positioned between the first stator 11 and the electrical connector 30 in the axial direction D1 defined along the first rotational axis A1 in a state where the electrical connector 30 is positioned in the first position P1 and where the second stator 12 is attached to the first stator 11. The second plate 14 is at least partially positioned between the first stator 11 and the electrical connector 30 in the axial direction D1 in the state where the electrical connector 30 is positioned in the first position P1 and where the second stator 12 is attached to the first stator 11.

In the first embodiment, the second stator 12 is partially positioned between the first stator 11 and the electrical connector 30 in the axial direction D1 in the state where the electrical connector 30 is positioned in the first position P1 and where the second stator 12 is attached to the first stator 11. The second plate 14 is partially positioned between the first stator 11 and the electrical connector 30 in the axial direction D1 in the state where the electrical connector 30 is positioned in the first position P1 and where the second stator 12 is attached to the first stator 11. However, the second stator 12 can be entirely positioned between the first stator 11 and the electrical connector 30 in the axial direction D1 in the state where the electrical connector 30 is positioned in the first position P1 and where the second stator 12 is attached to the first stator 11. The second plate 14 can be entirely positioned between the first stator 11 and the electrical connector 30 in the axial direction D1 in the state where the electrical connector 30 is positioned in the first position P1 and where the second stator 12 is attached to the first stator 11.

The second stator 12 is at least partially positioned between the first stator 11 and at least one of the connector case 31 and the lead block 32 in the axial direction D1 in the state where the electrical connector 30 is positioned in the first position P1 and where the second stator 12 is attached to the first stator 11. The second plate 14 is at least partially positioned between the first stator 11 and at least one of the connector case 31 and the lead block 32 in the axial direction D1 in the state where the electrical connector 30 is positioned in the first position P1 and where the second stator 12 is attached to the first stator 11.

In the first embodiment, the second stator 12 is partially positioned between the first stator 11 and the connector case 31 and between the first stator 11 and the lead block 32 in the axial direction D1 in the state where the electrical connector 30 is positioned in the first position P1 and where the second stator 12 is attached to the first stator 11. The second plate 14 is partially positioned between the first stator 11 and the connector case 31 and between the first stator 11 and the lead block 32 in the axial direction D1 in the state where the electrical connector 30 is positioned in the first position P1 and where the second stator 12 is attached to the first stator 11. However, the second stator 12 can be at least partially positioned between the first stator 11 and one of the connector case 31 and the lead block 32 in the axial direction D1 in the state where the electrical connector 30 is positioned in the first position P1 and where the second stator 12 is attached to the first stator 11. The second plate 14 can be at least partially positioned between the first stator 11 and one of the connector case 31 and the lead block 32 in the axial direction D1 in the state where the electrical connector 30 is positioned in the first position P1 and where the second stator 12 is attached to the first stator 11.

Figure 5:
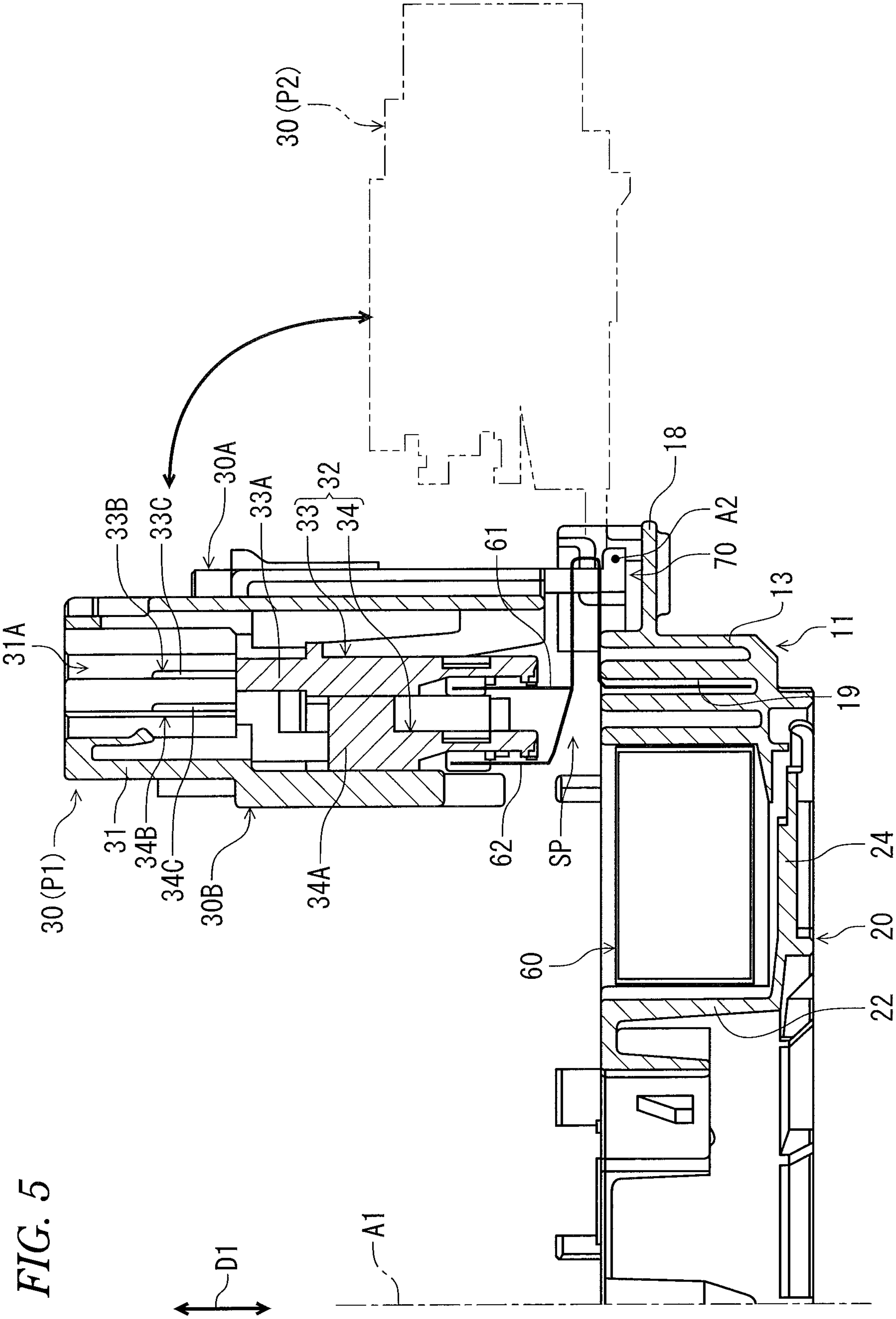
FIG. 5 is a cross-sectional view of a first stator, a rotator, an electrical cable, an electrical connector, and a connector coupling portion of the rotary connector device shown in FIG. 1.

As shown in FIG. 5, the electrical connector 30 includes a first surface 30A and a second surface 30B. The second surface 30B is provided on a reverse side of the first surface 30A. The second surface 30B is provided between the first rotational axis A1 and the first surface 30A in the state where the electrical connector 30 is positioned in the first position P1. The second surface 30B faces toward the first rotational axis A1 in the state where the electrical connector 30 is positioned in the first position P1. The first surface 30A is positioned in a position closer to the connector coupling portion 70 than the second surface 30B.

The connector coupling portion 70 is configured to support the electrical connector 30 in a cantilever manner with respect to the first stator 11 such that the second surface 30B becomes a free end in the state where the electrical connector 30 is positioned in the first position P1 and where the second stator 12 is detached from the first stator 11. The connector coupling portion 70 is positioned in a position closer to the first surface 30A than the second surface 30B with respect to the first stator 11 to support the electrical connector 30 in a cantilever manner in the state where the electrical connector 30 is positioned in the first position P1 and where the second stator 12 is detached from the first stator 11.

The electrical connector 30 is positioned to be spaced apart from the first stator 11 in the axial direction D1 defined along the first rotational axis A1 to form a space SP between the first stator 11 and the electrical connector 30 in a state where the electrical connector 30 is positioned in the first position P1. At least one of the connector case 31 and the lead block 32 is positioned to be spaced apart from the first stator 11 in the axial direction D1 to form the space SP between the first stator 11 and the electrical connector 30 in the state where the electrical connector 30 is positioned in the first position P1.

In the first embodiment, the connector case 31 and the lead block 32 are positioned to be spaced apart from the first stator 11 in the axial direction D1 to form the space SP between the first stator 11 and the electrical connector 30 in the state where the electrical connector 30 is positioned in the first position P1. However, only one of the connector case 31 and the lead block 32 can be positioned to be spaced apart from the first stator 11 in the axial direction D1 to form the space SP between the first stator 11 and the electrical connector 30 in the state where the electrical connector 30 is positioned in the first position P1.

In the first embodiment, the connector coupling portion 70 is configured to couple the electrical connector 30 to the first stator 11 rotatably about a second rotational axis A2. The electrical connector 30 is positionable in a second position P2 different from the first position P1 with respect to the first stator 11 in a state where the electrical connector 30 is coupled to the first stator 11. The electrical connector 30 is rotatable between the first position P1 and the second position P2 about the second rotational axis A. The electrical connector 30 positioned in the first position P1 is closer to the first rotational axis A1 than the electrical connector 30 positioned in the second position P2. However, rotation of the electrical connector 30 with respect to the first stator 11 about the second rotational axis A2 can be restricted such that the electrical connector 30 is not positioned in the second position P2.

In the first embodiment, an angle between the first position P1 and the second position P2 is approximately 90 degrees. However, the second position P2 is not limited to the illustrated position.

Figure 6:
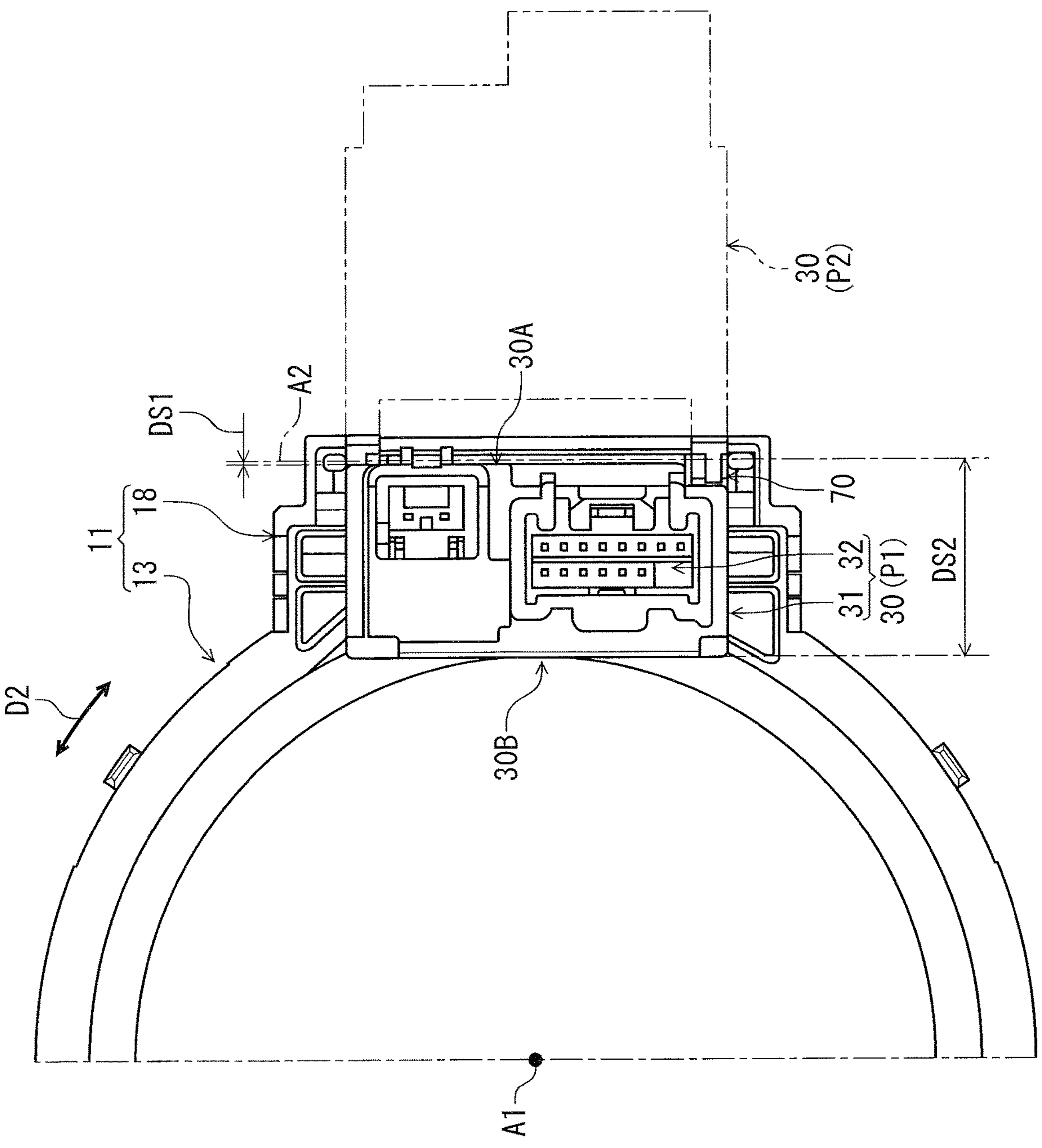
FIG. 6 is a plan view of the first stator, the electrical connector, and the connector coupling portion of the rotary connector device shown in FIG. 1.

As shown in FIG. 6, a first distance DS1 between the first surface 30A and the second rotational axis A2 is shorter than a second distance DS2 between the second surface 30B and the second rotational axis A2 as viewed along the first rotational axis A1 in the state where the electrical connector 30 is positioned in the first position P1. The second rotational axis A2 is provided radially outward of the electrical connector 30 with respect to the first rotational axis A1 as viewed along the first rotational axis A1 in the state where the electrical connector 30 is positioned in the first position P1. In the first embodiment, the second rotational axis A2 is provided radially outward of the lead block 32 with respect to the first rotational axis A1 as viewed along the first rotational axis A1 in the state where the electrical connector 30 is positioned in the first position P1. The second rotational axis A2 is skew to the first rotational axis A1. However, the arrangement of the second rotational axis A2 is not limited to the arrangement disclosed in the first embodiment.

The electrical connector 30 at least partially overlaps the first stator 11 as viewed along the first rotational axis A1 in the state where the electrical connector 30 is positioned in the first position P1. In the first embodiment, the electrical connector 30 entirely overlaps the first stator 11 as viewed along the first rotational axis A1 in the state where the electrical connector 30 is positioned in the first position P1. However, the electrical connector 30 can partially overlap the first stator 11 or can be positioned not to overlap the first stator 11 as viewed along the first rotational axis A1 in the state where the electrical connector 30 is positioned in the first position P1.

Figure 7:
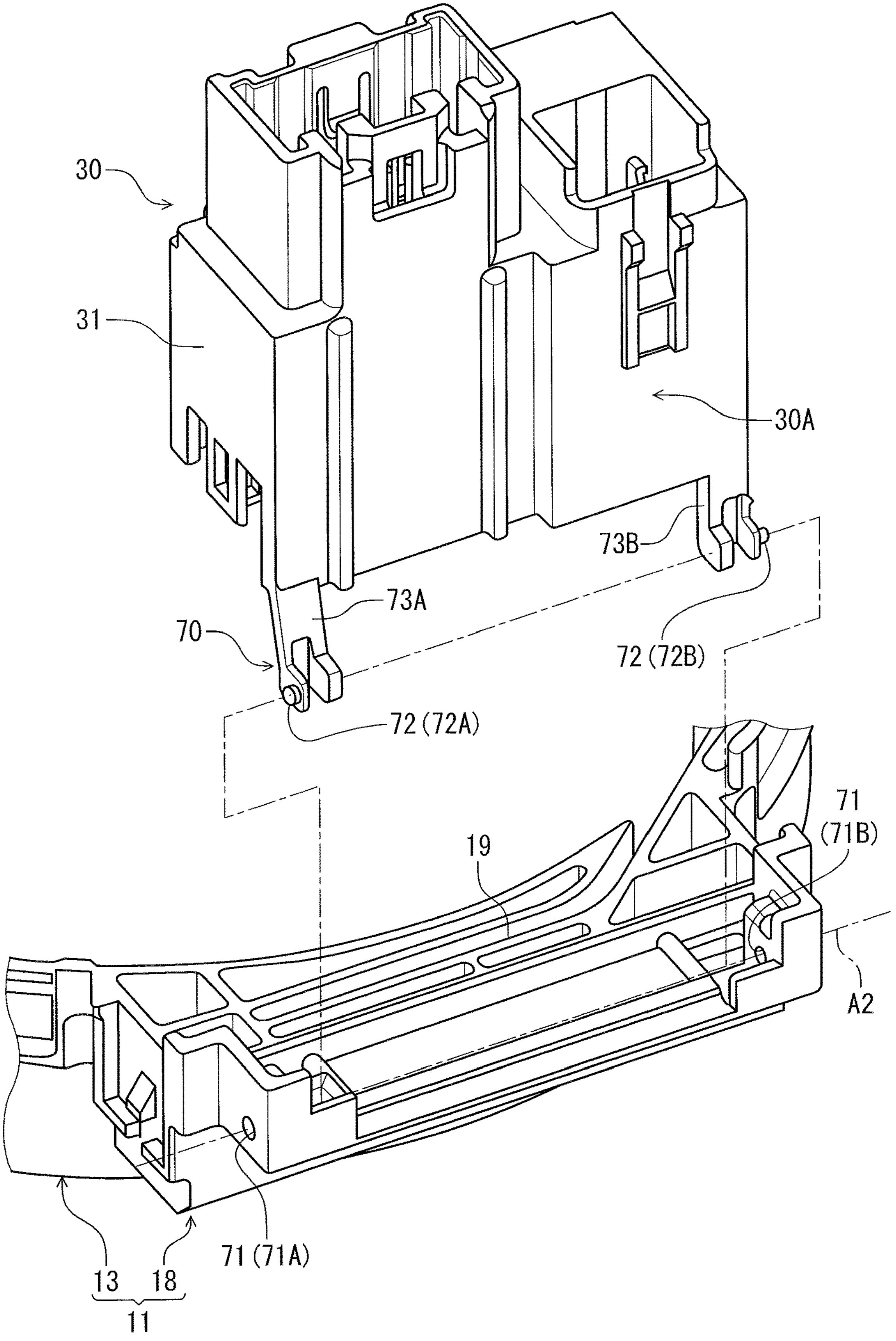
FIG. 7 is an exploded perspective view of the first stator, the electrical connector, and the connector coupling portion of the rotary connector device shown in FIG. 1.
Figure 8:
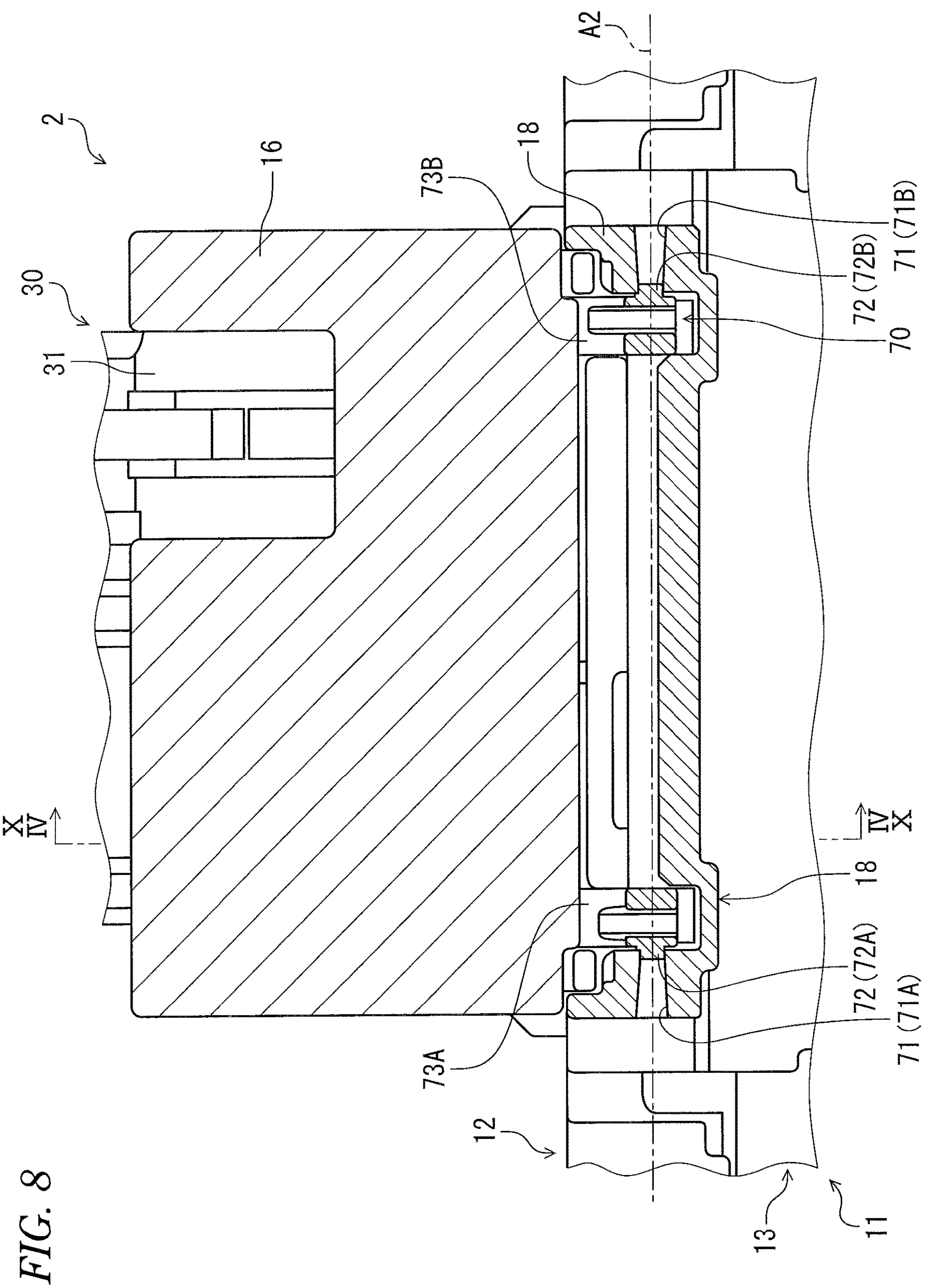
FIG. 8 is a cross-sectional view of the rotary connector device taken along line VIII-VIII of FIG. 4.

As shown in FIGS. 7 and 8, the connector coupling portion 70 is configured to detachably couple the electrical connector 30 to the first stator 11. One of the first stator 11 and the connector coupling portion 70 includes a support hole 71. The other of the first stator 11 and the connector coupling portion 70 includes a pin 72 provided in the support hole 71. In the first embodiment, the first stator 11 includes the support hole 71. The connector coupling portion 70 includes the pin 72. However, the first stator 11 can include the pin 72, and the connector coupling portion 70 can include the support hole 71.

The support hole 71 includes a first support hole 71A and a second support hole 71B. The pin 72 includes a first pin 72A provided in the first support hole 71A and a second pin 72B provided in the second support hole 71B. However, a total number of support holes included in the support hole 71 is not limited to a total number disclosed in the first embodiment. A total number of pins included in the pin 72 is not limited to a total number disclosed in the first embodiment.

The connector coupling portion 70 includes a first coupling arm 73A and a second coupling arm 73B. The first coupling arm 73A and the second coupling arm 73B protrude from the electrical connector 30 in the axial direction D1. The first coupling arm 73A and the second coupling arm 73B protrudes from the connector case 31 in the axial direction D1. The first coupling arm 73A and the second coupling arm 73B protrudes from the first surface 30A in the axial direction D1.

The first pin 72A is provided at the first coupling arm 73A. The second pin 72B is provided at the second coupling arm 73B. The first coupling arm 73A is positioned to be spaced apart from the second coupling arm 73B. The first pin 72A protrudes from the first coupling arm 73A away from the second pin 72B. The second pin 72B protrudes from the second coupling arm 73B away from the first pin 72A.

Figure 9:
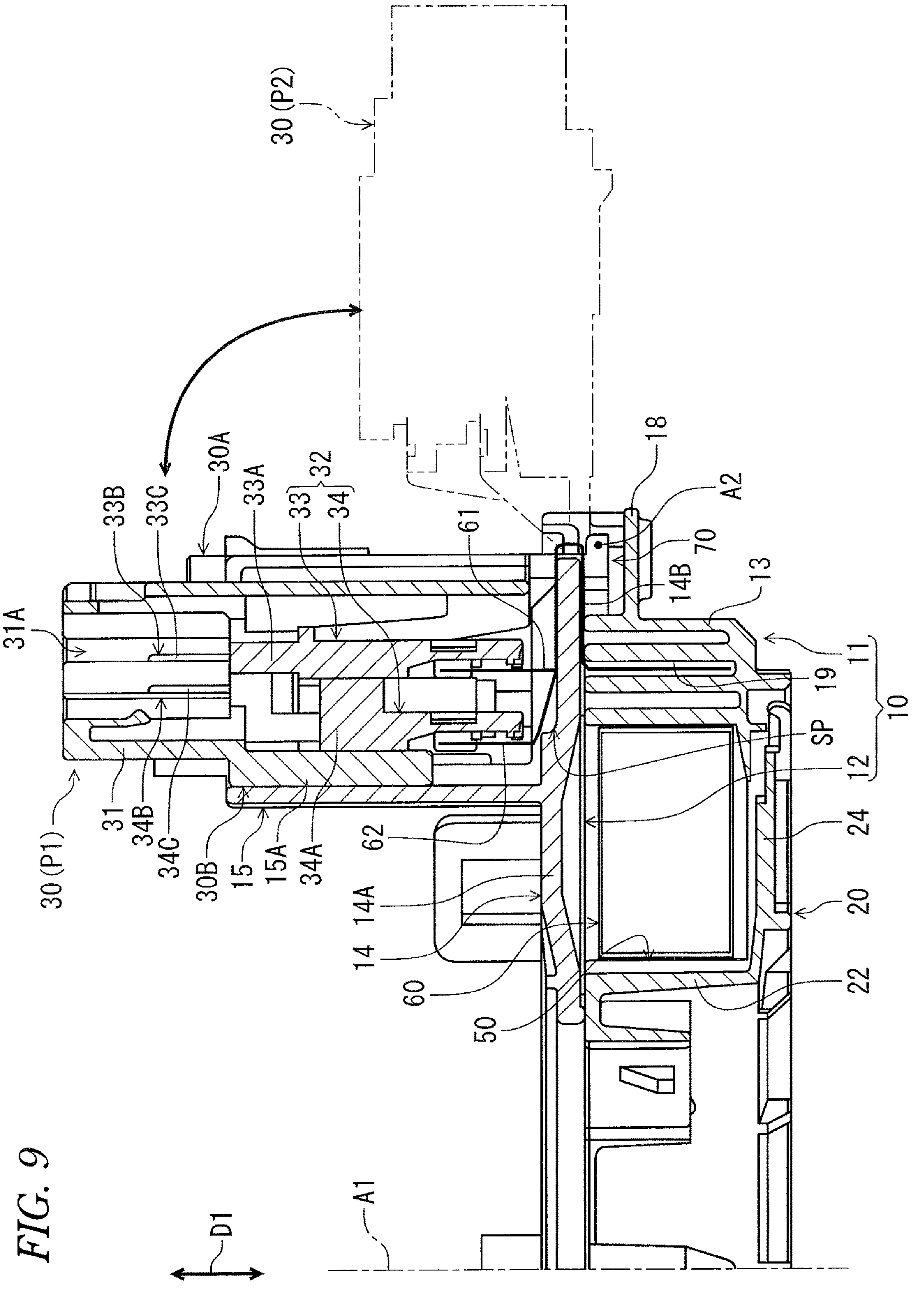
FIG. 9 is a cross-sectional view of the first stator, the second stator, the rotator, the electrical cable, the electrical connector, and the connector coupling portion of the rotary connector device shown in FIG. 1.

As shown in FIG. 9, the second stator 12 is attachable to the first stator 11 in a state where the electrical connector 30 is positioned in at least one of the first position P1 and the second position P2. The second plate 14 is attachable to the first stator 11 in a state where the electrical connector 30 is positioned in at least one of the first position P1 and the second position P2. The electrical connector 30 is rotatable between the first position P1 and the second position P2 about the second rotational axis A2 in a state where the second stator 12 is attached to the first stator 11.

In the first embodiment, the second stator 12 is attachable to the first stator 11 in a state where the electrical connector 30 is positioned in each of the first position P1 and the second position P2. The second plate 14 is attachable to the first stator 11 in a state where the electrical connector 30 is positioned in each of the first position P1 and the second position P2. The second stator 12 is insertable into the space SP in the state where the electrical connector 30 is positioned in the first position P1. The second plate 14 is insertable into the space SP in the state where the electrical connector 30 is positioned in the first position P1. However, the second stator 12 can be attachable to the first stator 11 only in a state where the electrical connector 30 is positioned in the second position P2. The second plate 14 can be attachable to the first stator 11 only in a state where the electrical connector 30 is positioned in the second position P2.

Figure 10:
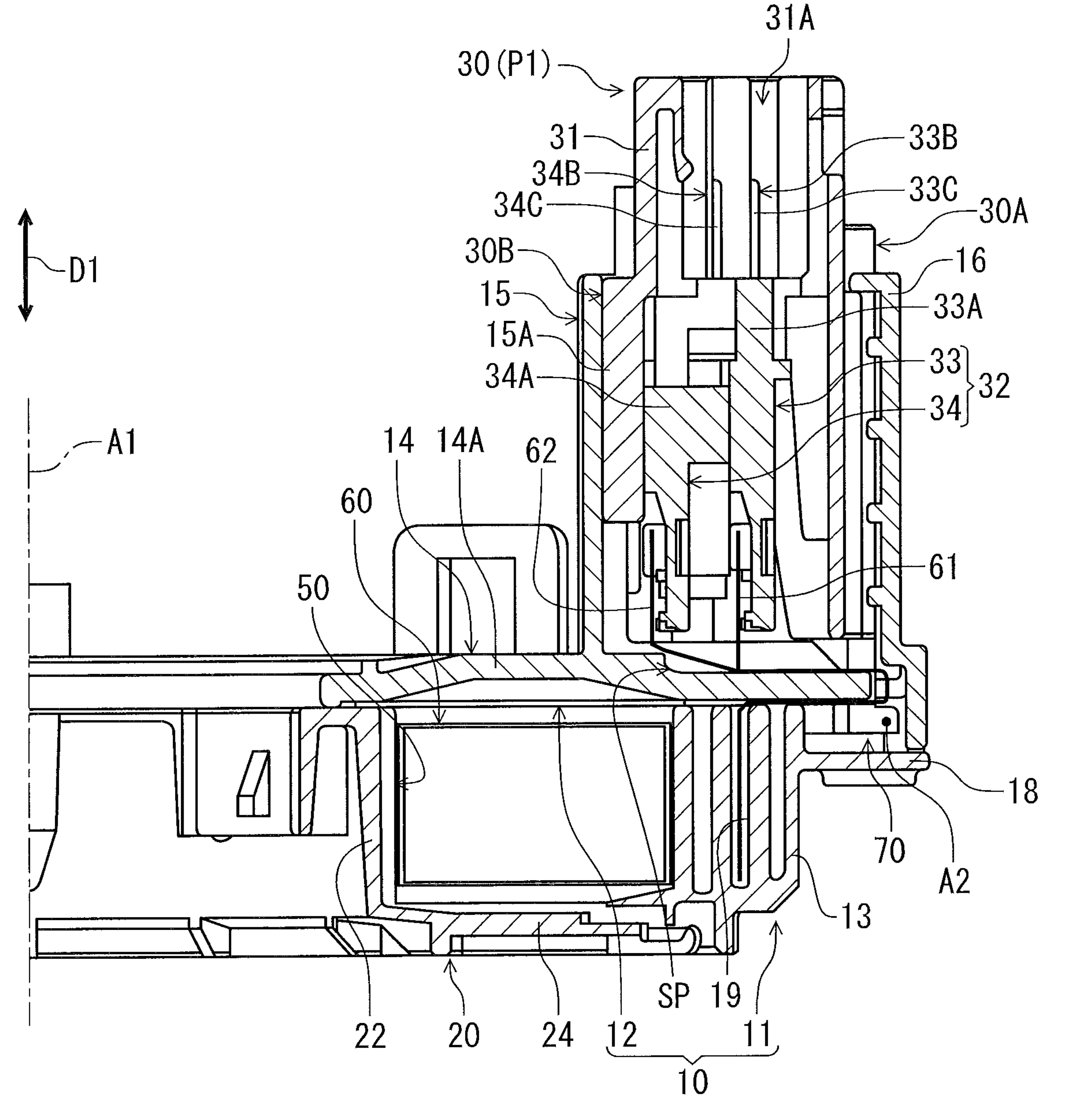
FIG. 10 is a cross-sectional view of the rotary connector device taken along line X-X of FIG. 8.

As shown in FIG. 10, the first connector cover 15 at least partially covers the electrical connector 30 in the state where the electrical connector 30 is positioned in the first position P1. The first connector cover 15 and the second connector cover 16 at least partially covers the electrical connector 30 in the state where the electrical connector 30 is positioned in the first position P1. In the first embodiment, the first connector cover 15 partially covers the electrical connector 30 in the state where the electrical connector 30 is positioned in the first position P1. The first connector cover 15 and the second connector cover 16 partially covers the electrical connector 30 in the state where the electrical connector 30 is positioned in the first position P1.

Figure 11:
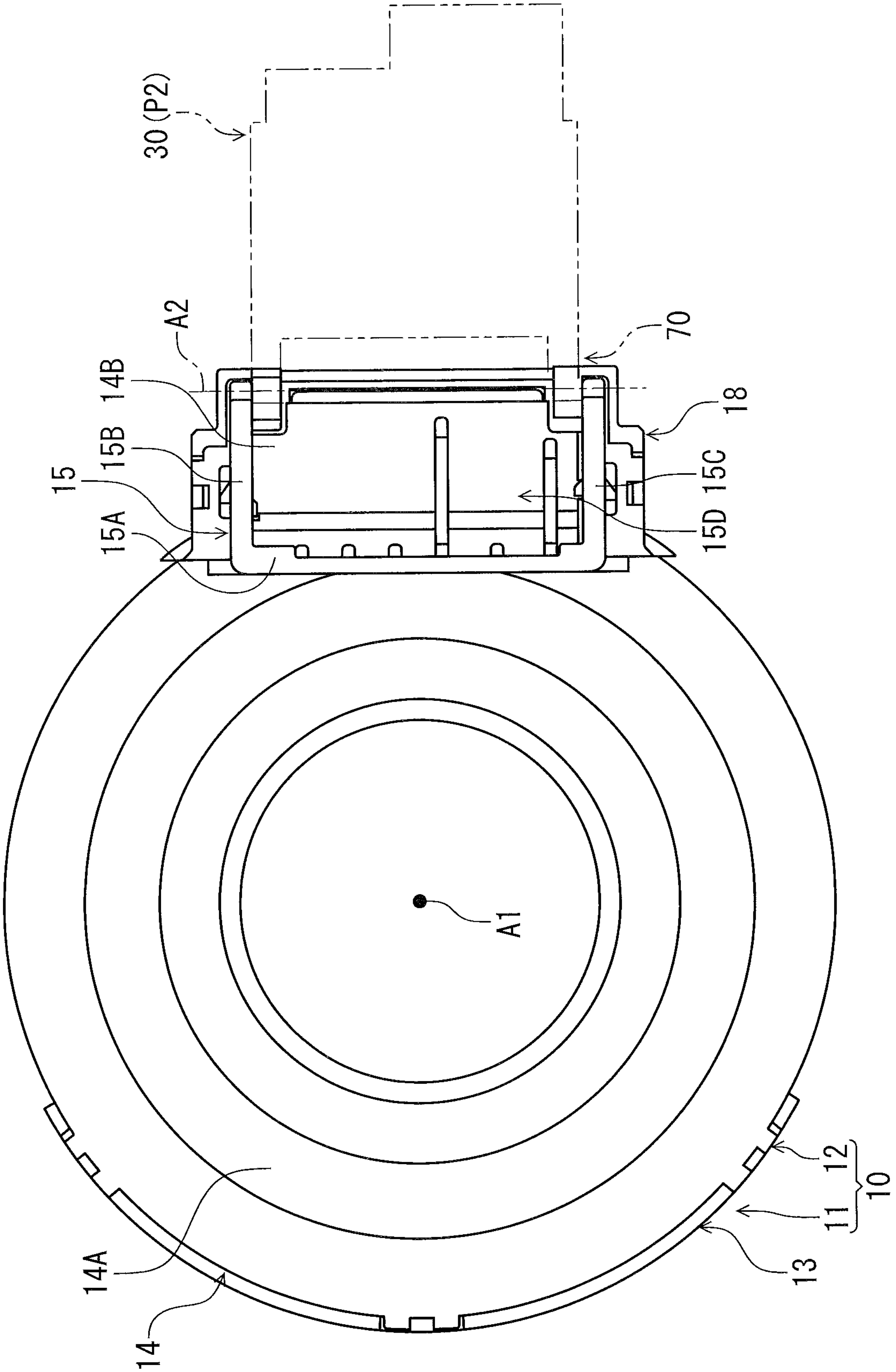
FIG. 11 is a plan view of the first stator and the second stator of the rotary connector device shown in FIG. 1.

As shown in FIG. 11, as viewed along the first rotational axis A1 in a state where the electrical connector 30 is positioned in the second position P2 and where the second stator 12 is attached to the first stator 11, the electrical connector 30 is positioned not to overlap the second plate 14 as viewed along the first rotational axis A1. However, the electrical connector 30 can be positioned to overlap the second plate 14 at least partially as viewed along the first rotational axis A1 in the state where the electrical connector 30 is positioned in the second position P2 and where the second stator 12 is attached to the first stator 11.

The manufacturing method of the rotary connector device 2 will be described referring to FIG. 12.

Figure 12:
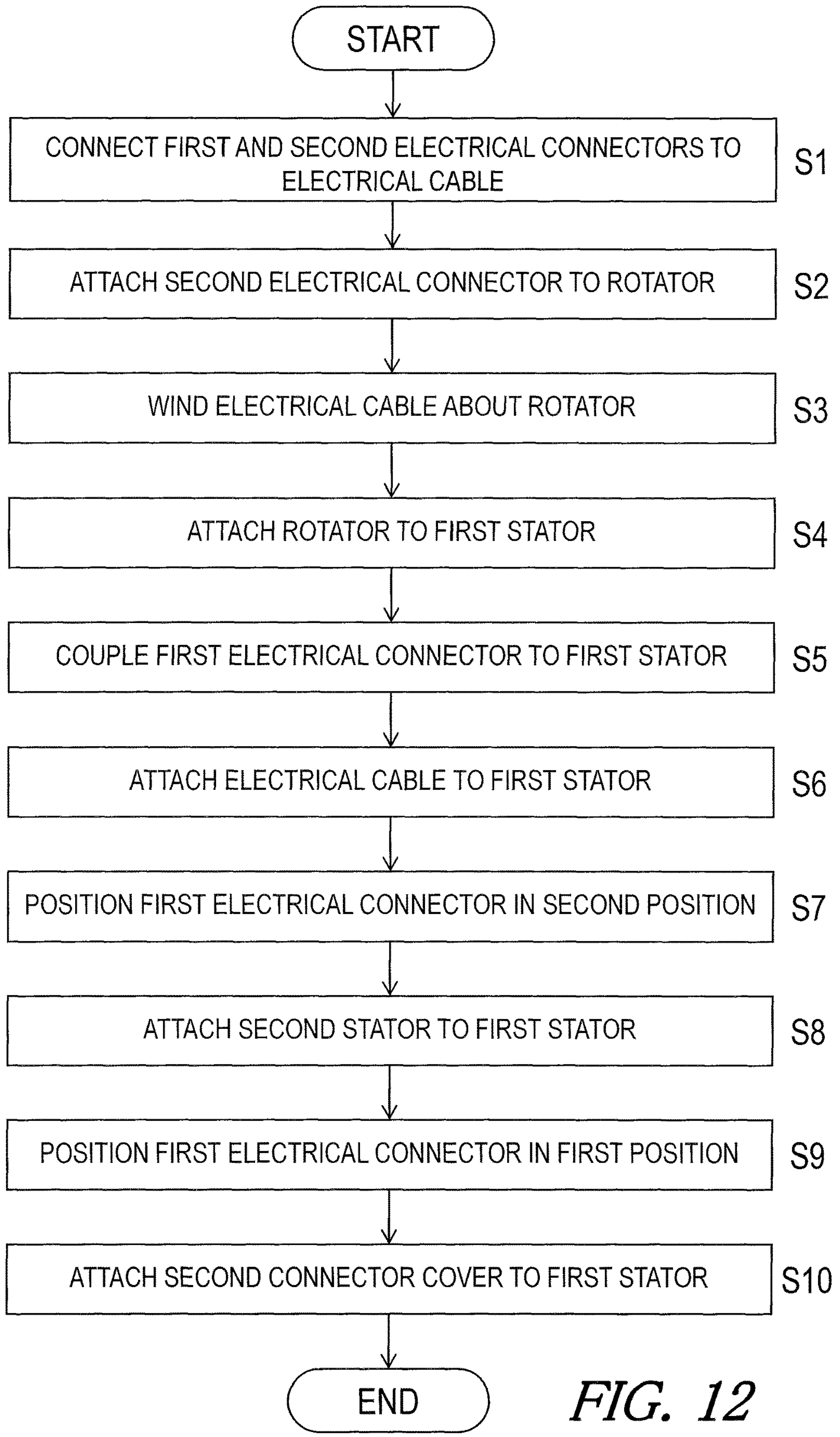
FIG. 12 shows a flowchart of a manufacturing method of the rotary connector device shown in FIG. 1.

As shown in FIG. 12, the first electrical connector 30 and the second electrical connector 40 are connected to the electrical cable 60 (step S1). Specifically, the lead block 32 (see e.g., FIG. 4) of the first electrical connector 30 and the lead block 42 (see e.g., FIG. 4) of the second electrical connector 40 are electrically connected to the electrical cable 60. The lead block 32 is attached to the connector case 31. The lead block 42 is attached to the connector case 41.

The second electrical connector 40 is attached to the rotator 20 (step S2). The electrical cable 60 is wound about the rotator 20 (step S3). The rotator 20 is attached to the first stator 11 (step S4). Specifically, as shown in FIG. 5, the inner peripheral wall 22 of the rotator 20 is positioned radially inward of the outer peripheral wall 13 of the first stator 11. The steps S3 and S4 can be executed in reverse order.

As shown in FIG. 12, the first electrical connector 30 is coupled to the first stator 11 via the connector coupling portion 70 (step S5). Namely, the manufacturing method of the rotary connector device 2 includes a step of coupling the first electrical connector 30 electrically connected to the electrical cable 60 to the first stator 11 via the connector coupling portion 70.

As shown in FIG. 5, the connector coupling portion 70 is configured to support the first electrical connector 30 in a cantilever manner with respect to the first stator 11 such that the second surface 30B becomes a free end in a state where the first electrical connector 30 is positioned in the first position P1 and where the second stator 12 is detached from the first stator 11. Thus, the step of coupling the first electrical connector 30 to the first stator 11 via the connector coupling portion 70 includes a step of coupling the first electrical connector 30 to the first stator 11 via the connector coupling portion 70 in a cantilever manner such that the second surface 30B becomes a free end in the state where the first electrical connector 30 is positioned in the first position P1 and where the second stator 12 is detached from the first stator 11.

At this time, as shown in FIG. 5, the first electrical connector 30 is positionable in the first position P1. Namely, the step of coupling the first electrical connector 30 to the first stator 11 via the connector coupling portion 70 includes a step of coupling the first electrical connector 30 to the first stator 11 via the connector coupling portion 70 such that the first electrical connector 30 is positionable in the first position P1 with respect to the first stator 11.

As shown in FIG. 7, when coupling the first electrical connector 30 to the first stator 11 via the connector coupling portion 70, the pin 72 is fitted in the support hole 71. More specifically, the first pin 72A is fitted in the first support hole 71A, and the second pin 72B is fitted in the second support hole 71B. Namely, the step of coupling the first electrical connector 30 to the first stator 11 via the connector coupling portion 70 includes a step of coupling the first electrical connector 30 to the first stator 11 rotatably about the second rotational axis A2.

As shown in FIG. 12, the electrical cable 60 is attached to the first stator 11 (step S6). Specifically, as shown in FIG. 5, the electrical cable 60 is set radially inward of the outer peripheral wall 13 of the first stator 11. Namely, the manufacturing method of the rotary connector device 2 includes a step of setting the electrical cable 60 radially inward of the outer peripheral wall 13 of the first stator 11.

As shown in FIG. 12, the manufacturing method of the rotary connector device 2 includes a step of attaching the second stator 12 to the first stator 11. Specifically, the first electrical connector 30 is positioned in the second position P2 in a state where the first electrical connector 30 is coupled to the first stator 11 (step S7). As shown in FIG. 9, the second stator 12 is attached to the first stator 11 in a state where the first electrical connector 30 is positioned in the second position P2 (step S8).

As shown in FIG. 12, the first electrical connector 30 is positioned in the first position P1 (step S9). As shown in FIG. 9, the first electrical connector 30 is rotated from the second position P2 to the first position P1 about the second rotational axis A2 in a state where the second stator 12 is attached to the first stator 11. At this time, the first electrical connector 30 is inserted into the connector housing space 15D of the first connector cover 15. The second stator 12 is at least partially positioned between the first stator 11 and the first electrical connector 30 in the axial direction D1 in the state where the first electrical connector 30 is positioned in the first position P1. Namely, the step of attaching the second stator 12 to the first stator 11 includes a step of attaching the second stator 12 to the first stator 11 such that the second stator 12 is at least partially positioned between the first stator 11 and the first electrical connector 30 in the axial direction D1 defined along the first rotational axis A1.

As shown in FIG. 12, the second connector cover 16 is attached to the first stator 11 (step S10). As shown in FIG. 10, the second connector cover 16 is attached to the first connector cover 15 in the state where the first electrical connector 30 is positioned in the first position P1. Thus, the position of the first electrical connector 30 is stabilized in the first position P1.

In the manufacturing method shown in FIG. 12, the second stator 12 is attached to the first stator 11 in a state where the first electrical connector 30 is positioned in the second position P2. However, the second stator 12 can be attached to the first stator 11 in the state where the first electrical connector 30 is positioned in the first position P1. In this case, in the step S7, the first electrical connector 30 is positioned in the first position P1, and the step S9 is omitted.

Second Embodiment

A rotary connector device 202 in accordance with a second embodiment will be described below referring to FIGS. 13 to 18. The rotary connector device 202 has the same structure as those of the rotary connector device 2 except for the electrical connector 30. Thus, elements having substantially the same function as those in the first embodiment will be numbered the same here and will not be described and/or illustrated again in detail here for the sake of brevity.

Figure 13:
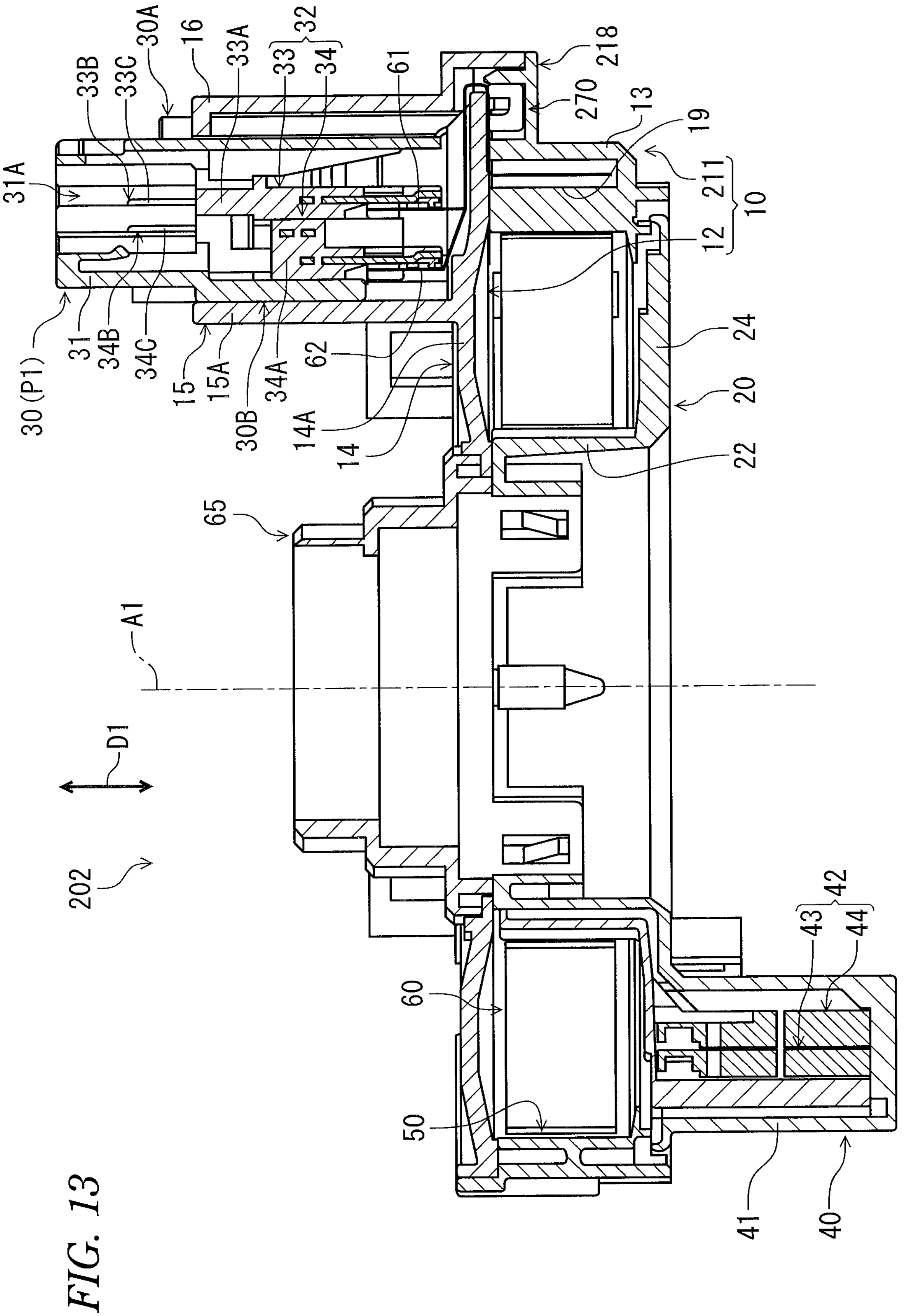
FIG. 13 is a cross-sectional view of a rotary connector device in accordance with a second embodiment.

As shown in FIG. 13, the rotary connector device 202 includes the stator 10, the rotator 20, the electrical cable 60, the electrical connector 30, and connector coupling portion 270. The stator 10 has the same structure as the structure of the stator 10 of the first embodiment. The rotator 20 has the same structure as the structure of the rotator 20 of the first embodiment. The electrical connector 30 has the same structure as the structure of the electrical connector 30 of the first embodiment. The connector coupling portion 270 has the same structure as the structure of the connector coupling portion 70 of the first embodiment.

The stator 10 includes a first stator 211 and the second stator 12. The first stator 211 includes the outer peripheral wall 13 and a connector support 218. The connector support 218 protrudes radially outward from the outer peripheral wall 13.

The connector coupling portion 270 is configured to couple the electrical connector 30 to the first stator 211. The connector coupling portion 270 is configured to couple the electrical connector 30 to the connector support 218. The connector coupling portion 270 couples the connector case 31 to the first stator 211. The connector coupling portion 270 couples the connector case 31 to the connector support 218.

As shown in FIG. 13, the connector coupling portion 270 is at least partially provided radially outward of the electrical connector 30 with respect to the first rotational axis A1 in the state where the electrical connector 30 is positioned in the first position P1. In the first embodiment, the connector coupling portion 270 is partially provided radially outward of the electrical connector 30 with respect to the first rotational axis A1 in the state where the electrical connector 30 is positioned in the first position P1. However, the connector coupling portion 270 can be provided radially outward of the electrical connector 30 with respect to the first rotational axis A1 in the state where the electrical connector 30 is positioned in the first position P1.

Figure 14:
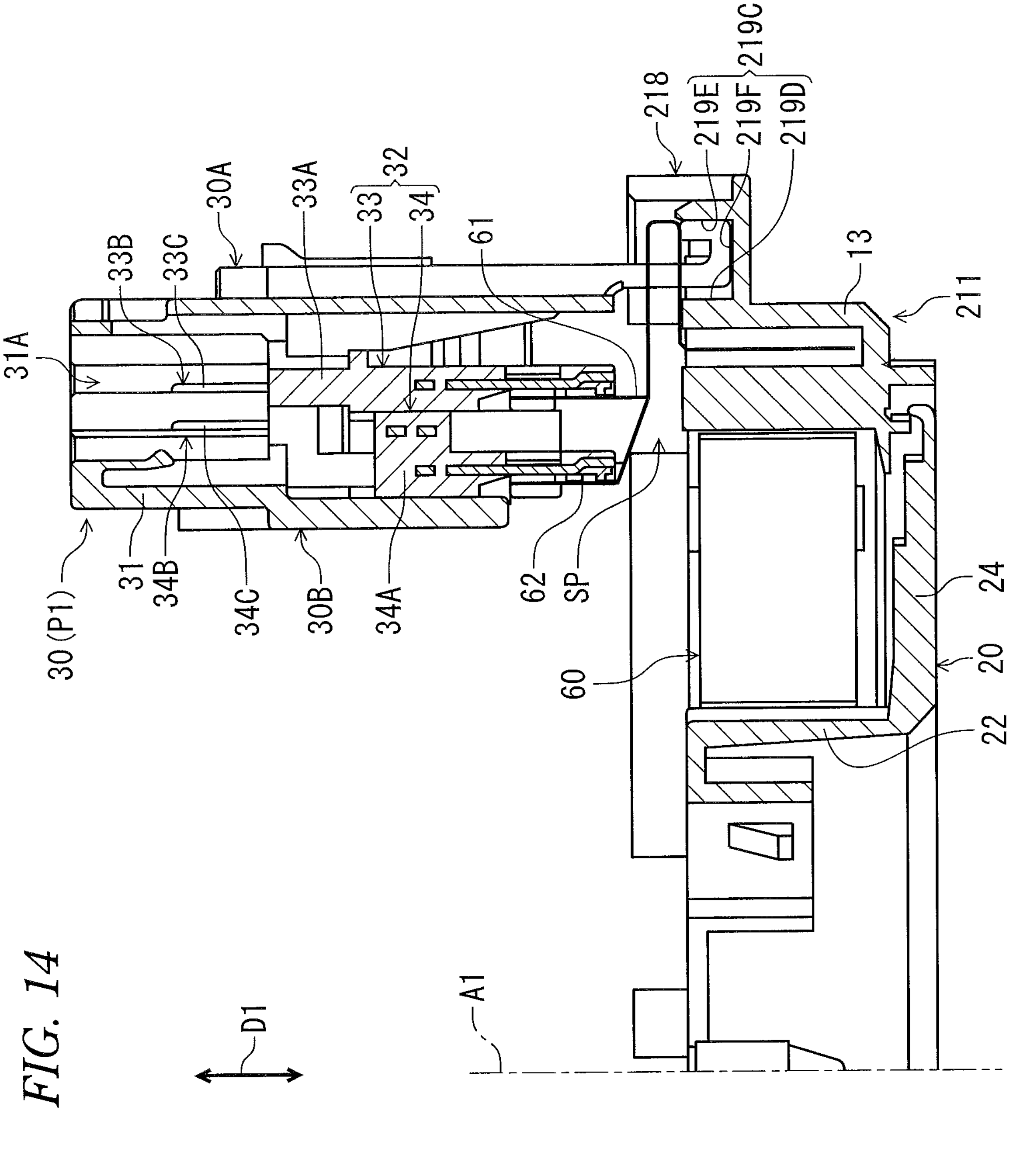
FIG. 14 is a cross-sectional view of a first stator, a rotator, electrical cable, an electrical connector, and a connector coupling portion of the rotary connector device shown in FIG. 13.

As shown in FIG. 14, the connector coupling portion 270 is configured to support the electrical connector 30 in a cantilever manner with respect to the first stator 211 such that the second surface 30B becomes a free end in the state where the electrical connector 30 is positioned in the first position P1 and where the second stator 12 is detached from the first stator 211. The connector coupling portion 270 is positioned in a position closer to the first surface 30A than the second surface 30B to support the electrical connector 30 in a cantilever with respect to the first stator 211 in the state where the electrical connector 30 is positioned in the first position P1 and where the second stator 12 is detached from the first stator 211.

The connector coupling portion 270 is configured to couple the electrical connector 30 to the first stator 211 to hold the electrical connector 30 in the first position P1. The connector coupling portion 270 restricts rotation of the electrical connector 30 with respect to the first stator 211 about the second rotational axis A2 such that the electrical connector 30 is not positioned in the second position P2.

Figure 15:
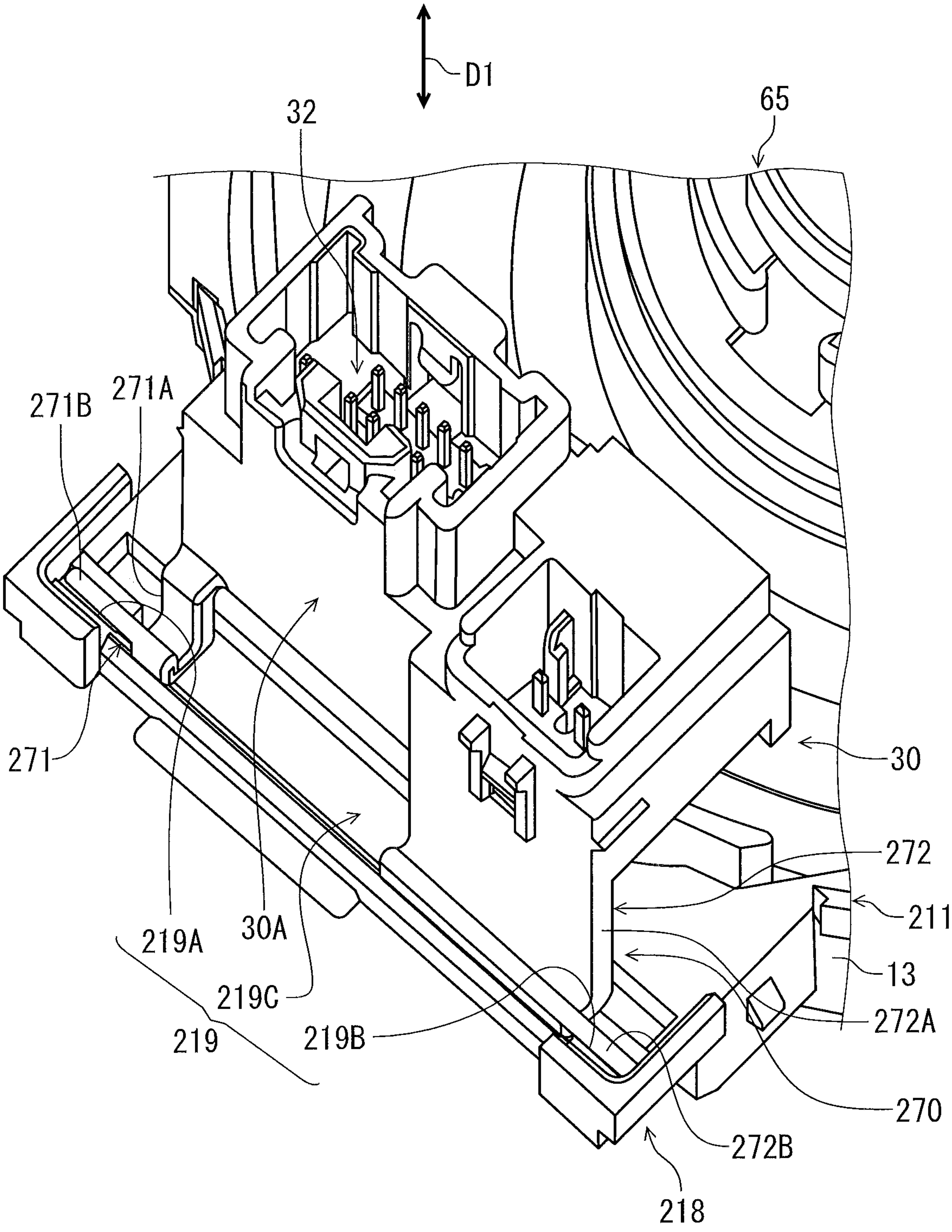
FIG. 15 is a perspective view of the first stator, the electrical connector, and the connector coupling portion of the rotary connector device shown in FIG. 13.
Figure 16:
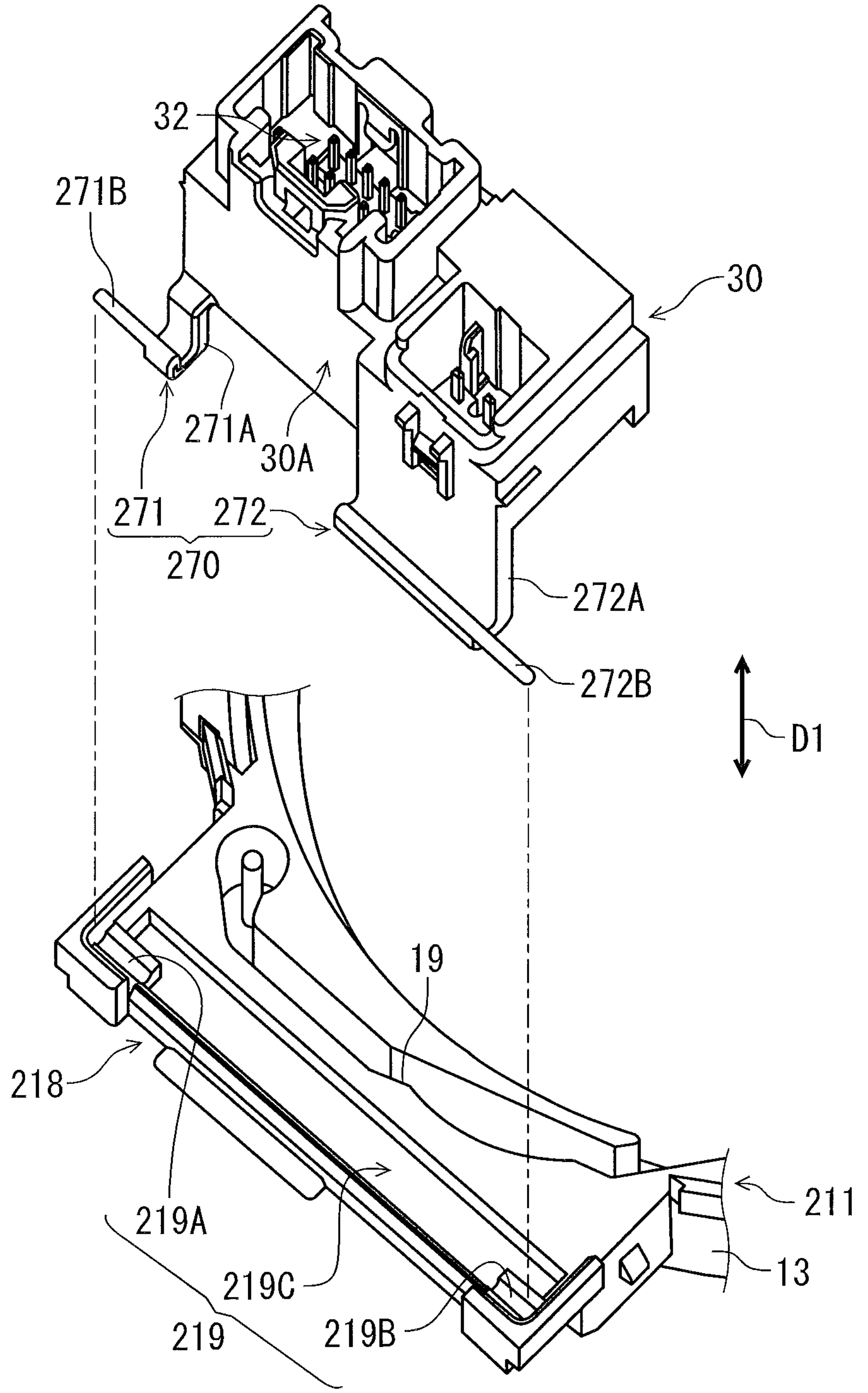
FIG. 16 is an exploded perspective view of the first stator, the electrical connector, and the connector coupling portion of the rotary connector device shown in FIG. 13.

As shown in FIGS. 15 and 16, the connector coupling portion 270 is configured to detachably couple the electrical connector 30 to the first stator 211. The connector coupling portion 270 fastens the connector case 31 to the first stator 211. The connector coupling portion 270 includes a first connector coupling portion 271 and a second connector coupling portion 272. The first connector coupling portion 271 is positioned to be spaced apart from the second connector coupling portion 272. The first connector coupling portion 271 includes a first coupling portion 271A and a first pin 271B. The first coupling portion 271A protrudes from the connector case 31 in the axial direction D1. The first pin 271B protrudes from the first coupling portion 271A in a direction different from the axial direction D1. The second connector coupling portion 272 includes a second coupling portion 272A and a second pin 272B. The second coupling portion 272A protrudes from the connector case 31 in the axial direction D1. The second pin 272B protrudes from the second coupling portion 272A in the axial direction D1.

The connector support 218 includes a coupling groove 219. The connector coupling portion 270 is at least partially positioned in the coupling groove 219 in a state where the electrical connector 30 is coupled to the first stator 211. The coupling groove 219 includes a first groove 219A, a second groove 219B, a third groove 219C. The first pin 271B is at least partially positioned in the first groove 219A in the state where the electrical connector 30 is coupled to the first stator 211. The second pin 272B is at least partially positioned in the second groove 219B in the state where the electrical connector 30 is coupled to the first stator 211. The first coupling portion 271A is at least partially positioned in the third groove 219C in the state where the electrical connector 30 is coupled to the first stator 211. The second coupling portion 272A is at least partially positioned in the third groove 219C in the state where the electrical connector 30 is coupled to the first stator 211.

As shown in FIG. 14, the third groove 219C includes a first inner surface 219D, a second inner surface 219E, and a bottom surface 219F. The connector coupling portion 270 is in contact with the bottom surface 219F in the state where the electrical connector 30 is positioned in the first position P1. The connector coupling portion 270 is at least partially positioned between the first inner surface 219D and the second inner surface 219E in the state where the electrical connector 30 is positioned in the first position P1. The connector coupling portion 270 is contactable with the first inner surface 219D and the second inner surface 219E. Thus, the third groove 219C restricts rotation of the connector coupling portion 270.

Figure 17:
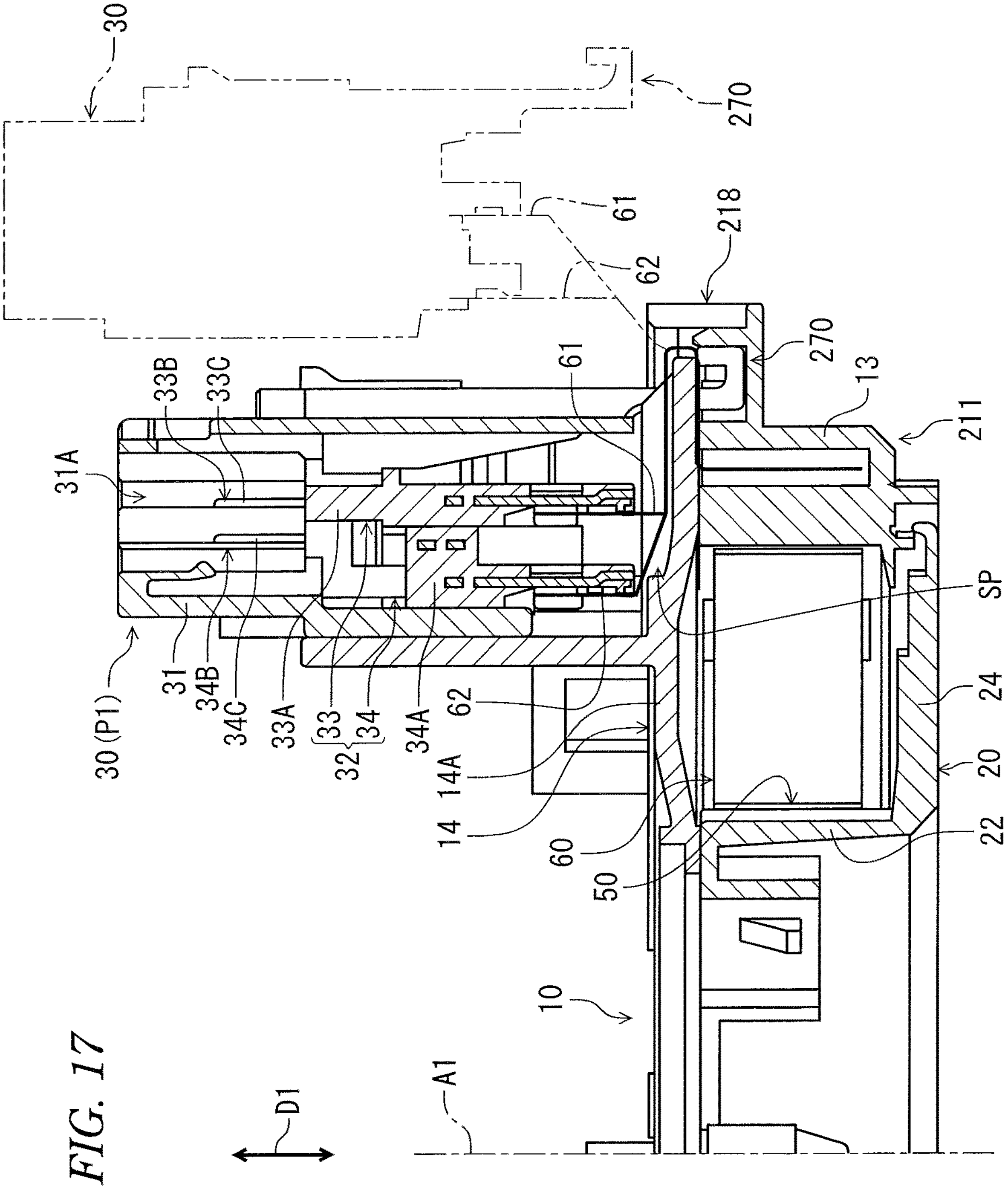
FIG. 17 is a cross-sectional view of the first stator, the second stator, the rotator, the electrical cable, the electrical connector, and the connector coupling portion of the rotary connector device shown in FIG. 13.

As shown in FIG. 17, the second stator 12 is attachable to the first stator 211 in a state where the electrical connector 30 is detached from the first stator 211 (a state where the connector coupling portion 270 does not couple the electrical connector 30 to the first stator 211). The second plate 14 is attachable to the first stator 211 in the state where the electrical connector 30 is detached from the first stator 211 (the state where the connector coupling portion 270 does not couple the electrical connector 30 to the first stator 211).

In the second embodiment, the second stator 12 is attachable to the first stator 211 in the state where the electrical connector 30 is positioned in the first position P1. The second plate 14 is attachable to the first stator 211 in the state where the electrical connector 30 is positioned in the first position P1. However, the second stator 12 may not be attachable to the first stator 211 in the state where the electrical connector 30 is positioned in the first position P1. The second plate 14 may not be attachable to the first stator 211 in the state where the electrical connector 30 is positioned in the first position P1.

The manufacturing method of the rotary connector device 202 will be described referring to FIG. 18.

Figure 18:
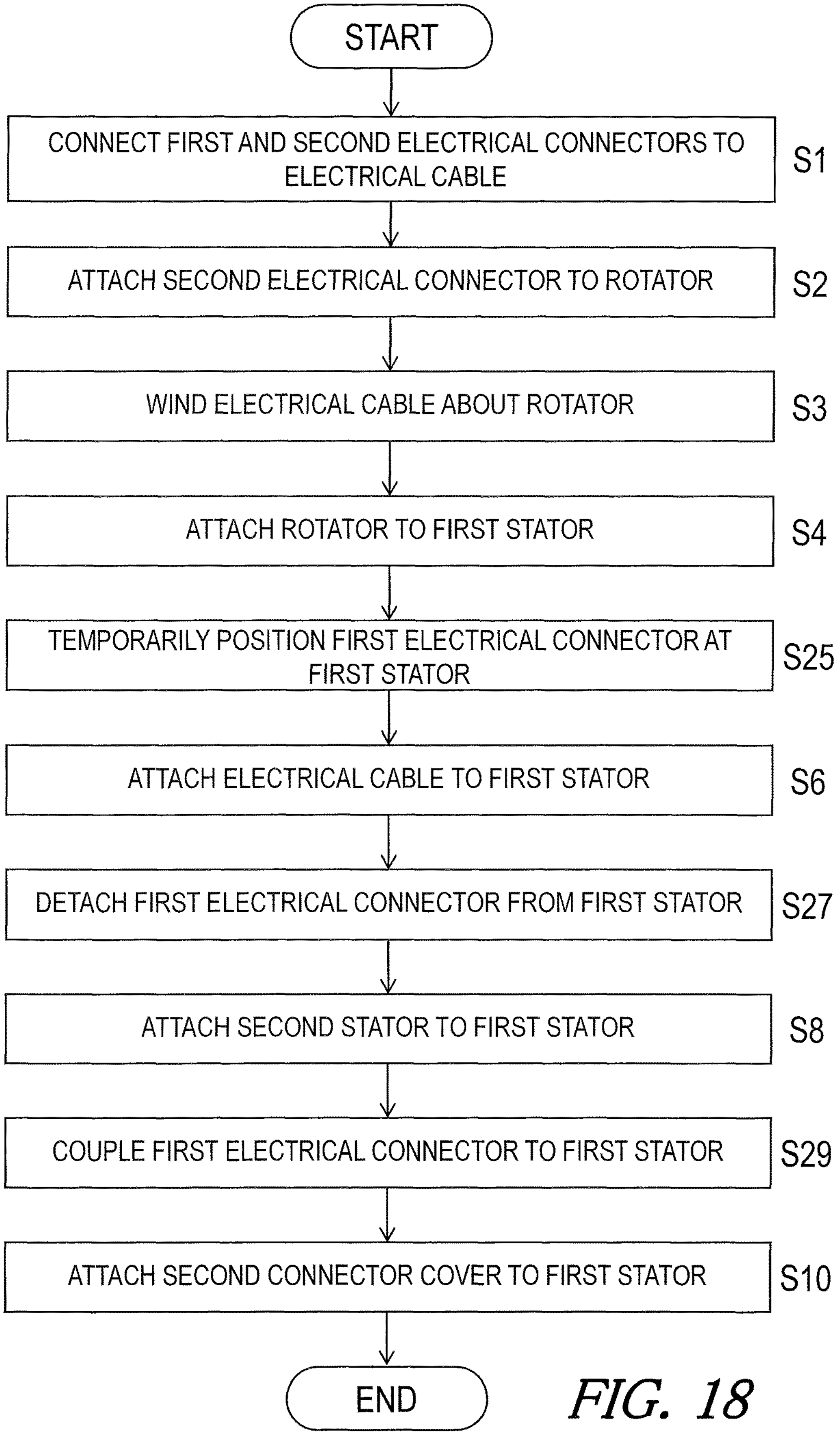
FIG. 18 shows a flowchart of a manufacturing method of the rotary connector device shown in FIG. 13.

As shown in FIG. 18, while the manufacturing method of the rotary connector device 202 is substantially the same as the manufacturing method of the rotary connector device 2 shown in FIG. 12, the steps S5, S7, and S9 shown in FIG. 12 are replaced with the steps S25, S27, and S29.

As shown in FIG. 18, the first electrical connector 30 is temporarily positioned at the first stator 211 (step S25). Specifically, the first electrical connector 30 is coupled to the first stator 211 via the connector coupling portion 270. Namely, the manufacturing method of the rotary connector device 202 includes a step of coupling the first electrical connector 30 electrically connected to the electrical cable 60 to the first stator 211 via the connector coupling portion 270.

As shown in FIG. 14, the connector coupling portion 270 is configured to support the first electrical connector 30 in a cantilever manner with respect to the first stator 211 such that the second surface 30B becomes a free end in the state where the first electrical connector 30 is positioned in the first position P1 and where the second stator 12 is detached from the first stator 211. Thus, the step of coupling the first electrical connector 30 to the first stator 211 via the connector coupling portion 270 includes a step of coupling the first electrical connector 30 to the first stator 211 via the connector coupling portion 270 in a cantilever manner such that the second surface 30B becomes a free end in the state where the first electrical connector 30 is positioned in the first position P1 and where the second stator 12 is detached from the first stator 211.

At this time, as shown in FIG. 17, the first electrical connector 30 is positionable in the first position P1. Namely, the step of coupling the first electrical connector 30 to the first stator 211 via the connector coupling portion 270 includes a step of coupling the first electrical connector 30 to the first stator 211 via the connector coupling portion 270 such that the first electrical connector 30 is positionable in the first position P1 with respect to the first stator 211.

As shown in FIG. 18, the electrical cable 60 is attached to the first stator 211 (step S5). Specifically, as shown in FIG. 14, the electrical cable 60 is set radially inward of the outer peripheral wall 13 of the first stator 211. Namely, the manufacturing method of the rotary connector device 202 includes a step of setting the electrical cable 60 radially inward of the outer peripheral wall 13 of the first stator 211. After the electrical cable 60 is attached to the first stator 211, the first electrical connector 30 is detached from the first stator 211 (step S27).

As shown in FIG. 18, the manufacturing method of the rotary connector device 202 includes a step of attaching the second stator 12 to the first stator 211. Specifically, as shown in FIG. 17, the second stator 12 is attached to the first stator 211 in a state where the first electrical connector 30 is detached from the first stator 211 (step S8).

As shown in FIG. 17, the second stator 12 is at least partially positioned between the first stator 211 and the first electrical connector 30 in the axial direction D1 in the state where the first electrical connector 30 is positioned in the first position P1. Namely, the step of attaching the second stator 12 to the first stator 211 includes a step of attaching the second stator 12 to the first stator 211 such that the second stator 12 is at least partially positioned between the first stator 211 and the first electrical connector 30 in the axial direction D1 defined along the first rotational axis A1.

After attaching the second stator 12 to the first stator 211, the first electrical connector 30 is coupled to the first stator 211 again (step S29).

In the manufacturing method shown in FIG. 18, the second stator 12 is attached to the first stator 211 in the state where the first electrical connector 30 is detached from the first stator 211. However, the second stator 12 can be attached to the first stator 211 in the state where the first electrical connector 30 is positioned in the first position P1.

As explained above, the rotary connector device 2 or 202 includes the stator 10, the rotator 20, the electrical cable 60, the electrical connector 30, and the connector coupling portion 70 or 270. The stator 10 includes the first stator 11 or 211 and the second stator 12 attached to the first stator 11 or 211. The rotator 20 is provided rotatably about the first rotational axis A1 with respect to the stator 10 and forms, along with the stator 10, the cable housing space 50 provided to surround the first rotational axis A1. The electrical cable 60 is provided in the cable housing space 50. The electrical connector 30 is electrically connected to the electrical cable 60. The connector coupling portion 70 or 270 is configured to couple the electrical connector 30 to the first stator 11 or 211. The electrical connector 30 is positionable in the first position P1 with respect to the first stator 11 or 211 in a state where the electrical connector 30 is coupled to the first stator 11 or 211. The electrical connector 30 includes the first surface 30A and the second surface 30B provided on a reverse side of the first surface 30A. The second surface 30B is positioned between the first rotational axis A1 and the first surface 30A in the state where the electrical connector 30 is positioned in the first position P1. The connector coupling portion 70 or 270 is configured to support the electrical connector 30 in a cantilever manner with respect to the first stator 11 or 211 such that the second surface 30B become a free end in the state where the electrical connector 30 is positioned in the first position P1 and where the second stator 12 is detached from the first stator 11 or 211. The second stator 12 is at least partially positioned between the first stator 11 or 211 and the electrical connector 30 in the axial direction D1 defined along the first rotational axis A1 in the state where the electrical connector 30 is positioned in the first position P1 and where the second stator 12 is attached to the first stator 11 or 211.

With the rotary connector device 2 or 202, the connector coupling portion 70 or 270 is configured to support the electrical connector 30 in a cantilever manner with respect to the first stator 11 or 211 such that the second surface 30B becomes a free end in the state where the electrical connector 30 is positioned in the first position P1 and where the second stator 12 is detached from the first stator 11 or 211. Thus, the position of the electrical connector 30 can be close to the first rotational axis A1 while making it easier to attach the second stator 12 to the first stator 11 or 211. This can provide the rotary connector device 2 or 202 that enables compatibility between improvement of assembling and downsizing.

The manufacturing method of the rotary connector device 2 or 202 includes: setting the electrical cable 60 radially inward of the outer peripheral wall of the first stator 11 or 211; coupling the electrical connector 30 electrically connected to the electrical cable 60 to the first stator 11 or 211 via the connector coupling portion 70 or 270; and attaching the second stator to the first stator 11 or 211. The coupling the electrical connector 30 to the first stator 11 or 211 via the connector coupling portion 70 or 270 includes coupling the electrical connector 30 to the first stator 11 or 211 via the connector coupling portion 70 or 270 such that the electrical connector 30 is positionable in the first position P1 with respect to the first stator 11 or 211. The electrical connector 30 includes the first surface 30A and the second surface 30B provided on a reverse side of the first surface 30A. The second surface 30B is positioned between the first rotational axis and the first surface 30A in a state where the electrical connector 30 is positioned in the first position P1. The coupling the electrical connector 30 to the first stator 11 or 211 via the connector coupling portion 70 or 270 includes coupling the electrical connector 30 to the first stator 11 or 211 in a cantilever manner via the connector coupling portion 70 or 270 such that the second surface 30B becomes a free end in the state where the electrical connector 30 is positioned in the first position P1 and where the second stator is detached from the first stator 11 or 211. The attaching the second stator to the first stator 11 or 211 includes attaching the second stator to the first stator 11 or 211 such that the second stator is at least partially positioned between the first stator 11 or 211 and the electrical connector 30 in the axial direction defined along the first rotational axis.

With the manufacturing method of the rotary connector device 2 or 202, the coupling the electrical connector 30 to the first stator 11 or 211 via the connector coupling portion 70 or 270 includes coupling the electrical connector 30 to the first stator 11 or 211 in a cantilever manner via the connector coupling portion 70 or 270 such that the second surface 30B becomes a free end in the state where the electrical connector 30 is positioned in the first position P1 and where the second stator is detached from the first stator 11 or 211. Thus, the position of the electrical connector 30 can be close to the first rotational axis A1 while making it easier to attach the second stator 12 to the first stator 11 or 211. This can provide the manufacturing method of the rotary connector device 2 or 202 that enables compatibility between improvement of assembling and downsizing.

In accordance with a first aspect, a rotary connector device includes, a stator, a rotator, an electrical cable, an electrical connector, and a connector coupling portion. The stator includes a first stator and a second stator attached to the first stator. The rotator is provided rotatably about a first rotational axis with respect to the stators and forms, along with the stator, a cable housing space provided to surround the first rotational axis. The electrical cable is provided in the cable housing space. The electrical connector is electrically connected to the electrical cable. The connector coupling portion is configured to couple the electrical connector to the first stator. The electrical connector is positionable in a first position with respect to the first stator in a state where the electrical connector is coupled to the first stator. The electrical connector includes a first surface and a second surface provided on a reverse side of the first surface. The second surface is positioned between the first rotational axis and the first surface in a state where the electrical connector is positioned in the first position. The connector coupling portion is configured to support the electrical connector in a cantilever manner with respect to the first stator such that the second surface becomes a free end in a state where the electrical connector is positioned in the first position and where the second stator is detached from the first stator. The second stator is at least partially positioned between the first stator and the electrical connector in an axial direction defined along the first rotational axis in a state where the electrical connector is positioned in the first position and where the second stator is attached to the first stator.

With the rotary connector device according to the first aspect, the connector coupling portion is configured to support the electrical connector in a cantilever manner with respect to the first stator such that the second surface becomes a free end in the state where the electrical connector is positioned in the first position and where the second stator is detached from the first stator. Thus, the position of the electrical connector can be close to the first rotational axis while making it easier to attach the second stator to the first stator. This can provide the rotary connector device that enables compatibility between improvement of assembling and downsizing.

In accordance with a second aspect, in the rotary connector device according to the first aspect, the rotator includes an inner peripheral wall provided radially inward of the cable housing space and a first plate extending radially outward from the inner peripheral wall. The first stator includes an outer peripheral wall provided radially outward of the cable housing space. The second stator includes a second plate attached to the outer peripheral wall and spaced apart from the first plate in the axial direction. The second plate is at least partially positioned between the first stator and the electrical connector in the axial direction in a state where the electrical connector is positioned in the first position and where the second stator is attached to the first stator.

With the rotary connector device according to the second aspect, it is possible to improve assembling by positioning the second plate at least partially between the first stator and the electrical connector in the axial direction.

In accordance with a third aspect, in the rotary connector device according to the first or second aspect, the connector coupling portion is configured to couple the electrical connector to the first stator rotatably about a second rotational axis.

With the rotary connector device according to the third aspect, it is possible to improve flexibility of the position of the electrical connector with respect to the first stator while stabilizing the position of the electrical connector with respect to the first stator.

In accordance with a fourth aspect, in the rotary connector device according to the third aspect, a first distance between the first surface and the second rotational axis is shorter than a second distance between the second surface and the second rotational axis as viewed along the first rotational axis in a state where the electrical connector is positioned in the first position.

With the rotary connector device according to the fourth aspect, it becomes easy to arrange the electrical connector radially inward, making it easy to downsize the rotary connector device.

In accordance with a fifth aspect, in the rotary connector device according to the third or fourth aspect, the second rotational axis is provided radially outward of the electrical connector with respect to the first rotational axis as viewed along the first rotational axis in a state where the electrical connector is positioned in the first position.

With the rotary connector device according to the fifth aspect, it becomes easy to arrange the electrical connector radially inward, making it easier to downsize the rotary connector device.

In accordance with a sixth aspect, in the rotary connector device according to any one of the third to fifth aspect, the electrical connector is rotatable about the second rotational axis between the first position and the second position. The electrical connector positioned in the first position is closer to the first rotational axis than the electrical connector positioned in the second position.

With the rotary connector device according to the sixth aspect, it becomes easy to attach the second stator to the first stator by arranging the electrical connector in the second position when attaching the second stator to the first stator.

In accordance with a seventh aspect, in the rotary connector device according to the sixth aspect, the electrical connector is positioned not to overlap with the second plate as viewed along the first rotational axis in a state where the electrical connector is positioned in the second position and where the second stator is attached to the first stator.

With the rotary connector device according to the seventh aspect, it becomes easier to attach the second stator to the first stator by arranging the electrical connector in the second position when attaching the second stator to the first stator.

In accordance with an eighth aspect, in the rotary connector device according to the sixth or seventh aspect, the electrical connector is rotatable about the second rotational axis between the first position and the second position in a state where the second stator is attached to the first stator.

With the rotary connector device according to the eighth aspect, it is possible to arrange the electrical connector in the first position after attaching the second stator to the first stator, making it easier to attach the second stator to the first stator.

In accordance with the ninth aspect, in the rotary connector device according to any one of the third to eighth aspect, the electrical connector includes a connector case including an internal space and a lead block electrically connected to the electrical cable provided in the internal space. The second stator is at least partially positioned between the first stator and at least one of the connector case and the lead block in the axial direction in a state where the electrical connector is positioned in the first position and where the second stator is attached to the first stator.

With the rotary connector device according to the ninth aspect, it becomes easy to arrange the electrical connector radially inward, making it easy to downsize the rotary connector device.

In accordance with the tenth aspect, in the rotary connector device according to the ninth aspect, the second rotational axis is provided radially outward of the lead block with respect to the first rotational axis as viewed along the first rotational axis in the state where the electrical connector is positioned in the first position.

With the rotary connector device according to the tenth aspect, it becomes easier to arrange the electrical connector radially inward, making it easier to downsize the rotary connector device.

In accordance with the eleventh aspect, in the rotary connector device according to any one of the first to tenth aspects, one of the first stator and the connector coupling portion includes a supporting hole. The other of the first stator and the connector coupling portion includes a pin provided in the supporting hole.

With the rotary connector device according to the eleventh aspect, it is possible to realize the connector coupling portion with a simple structure.

In accordance with the twelfth aspect, in the rotary connector device according to the eleventh aspect, the supporting hole includes a first supporting hole and a second supporting hole. The pin includes a first pin provided in the first supporting hole and a second pin provided in the second supporting hole.

With the rotary connector device according to the twelfth aspect, the coupling strength between the first stator and the electrical connector by the connector coupling portion improves.

In accordance with the thirteenth aspect, in the rotary connector device according to any one of the first to twelfth aspects, the connector coupling portion is configured to detachably couple the electrical connector to the first stator.

With the rotary connector device according to the thirteenth aspect, it becomes easy to attach the second stator to the first stator by detaching the electrical connector when attaching the second stator to the first stator.

In accordance with the fourteenth aspect, a manufacturing method of a rotary connector device includes: setting an electrical cable radially inward of an outer peripheral wall of a first stator; coupling an electrical connector connected electrically to the electrical cable to the first stator via a connector coupling portion; attaching a second stator to the first stator. The coupling the electrical connector to the first stator via the connector coupling portion includes coupling the electrical connector to the first stator via the connector coupling portion so that the electrical connector is positionable in a first position with respect to the first stator. The electrical connector includes a first surface and a second surface provided on a reverse side of the first surface. The second surface is positioned between a first rotational axis and the first surface in a state where the electrical connector is positioned in the first position. The coupling the electrical connector to the first stator via the connector coupling portion includes coupling the electrical connector to the first stator in a cantilever manner via the connector coupling portion so that the second surface becomes a free end in a state where the electrical connector is positioned in the first position and where the second stator is detached from the first stator. The attaching the second stator to the first stator includes attaching the second stator to the first stator so that the second stator is at least partially positioned between the first stator and the electrical connector in an axial direction defined along the first rotational axis.

With the manufacturing method according to the fourteenth aspect, the coupling the electrical connector to the first stator via the connector coupling portion includes the coupling the electrical connector to the first stator in a cantilever manner via the connector coupling portion so that the second surface becomes a free end in a state where the electrical connector is positioned in the first position and where the second stator is detached from the first stator. Thus, the position of the electrical connector can be close to the first rotational axis while making it easier to attach the second stator to the first stator. This can provide the rotary connector device that enables compatibility between improvement of assembling and downsizing.

In accordance with the fifteenth aspect, in the manufacturing method according to the fourteenth aspect, the coupling the electrical connector to the first stator via the connector coupling portion includes coupling the electrical connector to the first stator rotatably about the second rotational axis.

With the manufacturing method according to the fifteenth aspect, it is possible to improve flexibility of the position of the electrical connector with respect to the first stator while stabilizing the position of the electrical connector with respect to the first stator.

In the present application, the term "comprising" and its derivatives, as used herein, are intended to be open ended terms that specify the presence of the stated features, elements, components, groups, integers, and/or steps, but do not exclude the presence of other unstated elements. This concept also applies to words of similar meaning, for example, the terms "have," "include" and their derivatives.

In the present application, the ordinal numbers such as "first" and "second" recited in the present application are merely identifiers, but do not have any other meanings (for example, a particular order and the like). Moreover, for example, the term "first element" itself does not imply an existence of "second element," and the term "second element" itself does not imply an existence of "first element."

Additionally, expressions such as "parallel," "orthogonal," and "identical" in the present disclosure should not be interpreted strictly and include respectively the meanings of "substantially parallel," "substantially orthogonal," and "substantially identical". In addition, other expressions related to the arrangement are not strictly construed.

The expression "at least one of A and B" in the present disclosure includes, for example, all of (1) A alone, (2) B alone, and (3) both A and B. The expression "at least one of A, B and C" includes, for example, all of (1) A alone, (2) B alone, (3) C alone, (4) A and B, (5) B and C, (6) A and C, and (7) A, B and C. In the present disclosure, the expression "at least one of A and B" is not construed as "at least one of A and at least one of B."

It is apparent from the above disclosure that various changes and modifications of the present invention are possible. Accordingly, the present invention may be implemented in a manner different from the specific disclosure of the present application without departing from the spirit of the present invention.

What is claimed is:

1. A rotary connector device comprising:

a stator including a first stator and a second stator attached to the first stator;

a rotator provided rotatably about a first rotational axis with respect to the stators, the rotator forming, along with the stator, a cable housing space provided to surround the first rotational axis;

an electrical cable provided in the cable housing space;

an electrical connector electrically connected to the electrical cable; and a connector coupling portion configured to couple the electrical connector to the first stator, the electrical connector being positionable in a first position with respect to the first stator in a state where the electrical connector is coupled to the first stator, the electrical connector including a first surface and a second surface provided on a reverse side of the first surface, the second surface being positioned between the first rotational axis and the first surface in a state where the electrical connector is positioned in the first position;

the connector coupling portion being configured to support the electrical connector in a cantilever manner with respect to the first stator such that the second surface becomes a free end in a state where the electrical connector is positioned in the first position and where the second stator is detached from the first stator, and the second stator being at least partially positioned between the first stator and the electrical connector in an axial direction defined along the first rotational axis in a state where the electrical connector is positioned in the first position and where the second stator is attached to the first stator.

2. The rotary connector device according to claim 1, wherein the rotator includes an inner peripheral wall provided radially inward of the cable housing space, and a first plate extending radially outward from the inner peripheral wall, the first stator includes an outer peripheral wall provided radially outward of the cable housing space, the second stator includes a second plate attached to the outer peripheral wall and spaced apart from the first plate in the axial direction, and the second plate is at least partially positioned between the first stator and the electrical connector in the axial direction in a state where the electrical connector is positioned in the first position and where the second stator is attached to the first stator.

3. The rotary connector device according to claim 1, wherein the connector coupling portion is configured to couple the electrical connector to the first stator rotatably about a second rotational axis.

4. The rotary connector device according to claim 3, wherein a first distance between the first surface and the second rotational axis is shorter than a second distance between the second surface and the second rotational axis as viewed along the first rotational axis in a state where the electrical connector is positioned in the first position.

5. The rotary connector device according to claim 3, wherein the second rotational axis is provided radially outward of the electrical connector with respect to the first rotational axis as viewed along the first rotational axis in a state where the electrical connector is positioned in the first position.

6. The rotary connector device according to claim 3, wherein the electrical connector is rotatable about the second rotational axis between the first position and a second position, and the electrical connector positioned in the first position is closer to the first rotational axis than the electrical connector positioned in the second position.

7. The rotary connector device according to claim 6, wherein the electrical connector is positioned not to overlap with the second plate as viewed along the first rotational axis in a state where the electrical connector is positioned in the second position and where the second stator is attached to the first stator.

8. The rotary connector device according to claim 6, wherein the electrical connector is rotatable about the second rotational axis between the first position and the second position in a state where the second stator is attached to the first stator.

9. The rotary connector device according to claim 3, wherein the electrical connector includes a connector case including an internal space, and a lead block electrically connected to the electrical cable provided in the internal space, and the second stator is at least partially positioned between the first stator and at least one of the connector case and the lead block in the axial direction in a state where the electrical connector is positioned in the first position and where the second stator is attached to the first stator.

10. The rotary connector device according to claim 9, wherein the second rotational axis is provided radially outward of the lead block with respect to the first rotational axis as viewed along the first rotational axis in the state where the electrical connector is positioned in the first position.

11. The rotary connector device according to claim 1, wherein one of the first stator and the connector coupling portion includes a supporting hole, and the other of the first stator and the connector coupling portion includes a pin provided in the supporting hole.

12. The rotary connector device according to claim 11, wherein the supporting hole includes a first supporting hole and a second supporting hole, and the pin includes a first pin provided in the first supporting hole, and a second pin provided in the second supporting hole.

13. The rotary connector device according to claim 1, wherein the connector coupling portion is configured to detachably couple the electrical connector to the first stator.

14. A manufacturing method of a rotary connector device, comprising:

setting an electrical cable radially inward of an outer peripheral wall of a first stator;

coupling an electrical connector connected electrically to the electrical cable to the first stator via a connector coupling portion; and attaching a second stator to the first stator, wherein the coupling the electrical connector to the first stator via the connector coupling portion includes coupling the electrical connector to the first stator via the connector coupling portion so that the electrical connector is positionable in a first position with respect to the first stator, the electrical connector includes a first surface and a second surface provided on a reverse side of the first surface, the second surface is positioned between a first rotational axis and the first surface in a state where the electrical connector is positioned in the first position, the coupling the electrical connector to the first stator via the connector coupling portion includes coupling the electrical connector to the first stator in a cantilever manner via the connector coupling portion so that the second surface becomes a free end in a state where the electrical connector is positioned in the first position and where the second stator is detached from the first stator, and the attaching the second stator to the first stator includes attaching the second stator to the first stator so that the second stator is at least partially positioned between the first stator and the electrical connector in an axial direction defined along the first rotational axis.

15. The manufacturing method of a rotary connector device according to claim 14, wherein the coupling the electrical connector to the first stator via the connector coupling portion includes coupling the electrical connector to the first stator rotatably about a second rotational axis.

* * * * *